United States Patent
Matsui et al.

(10) Patent No.: US 6,466,669 B1
(45) Date of Patent: Oct. 15, 2002

(54) CIPHER PROCESSOR, IC CARD AND CIPHER PROCESSING METHOD

(75) Inventors: Mitsuru Matsui; Toshio Tokita, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/214,271
(22) PCT Filed: Apr. 24, 1998
(86) PCT No.: PCT/JP98/01898
§ 371 (c)(1),
(2), (4) Date: Dec. 31, 1998
(87) PCT Pub. No.: WO98/54687
PCT Pub. Date: Dec. 3, 1998

(30) Foreign Application Priority Data

May 30, 1997 (JP) .............................................. 9-141328

(51) Int. Cl.[7] .................................................. H04L 9/06
(52) U.S. Cl. ............................................ 380/37; 380/29
(58) Field of Search ...................................... 380/37, 29

(56) References Cited

U.S. PATENT DOCUMENTS

| | | |
|---|---|---|
| 5,168,521 A | 12/1992 | Delaporte et al. |
| 5,317,638 A | 5/1994 | Kao et al. |
| 5,488,661 A | 1/1996 | Matsui |
| 5,687,238 A | * 11/1997 | Shimada et al. ............... 380/42 |

FOREIGN PATENT DOCUMENTS

| | | |
|---|---|---|
| EP | A20500244 | 8/1992 |
| JP | 6037586 | 2/1985 |
| JP | 61117940 | 6/1986 |
| JP | 1276189 | 11/1989 |
| JP | 3129384 | 6/1991 |
| JP | 4170576 | 6/1992 |
| JP | 535448 | 2/1993 |
| JP | 588849 | 4/1993 |
| JP | 7191603 | 7/1995 |
| JP | 09090870 A | 4/1997 |
| WO | 9709705 | 7/1996 |

OTHER PUBLICATIONS

Technical Report of IEICE.ISEC96–11, The Institute of Electronics, Information and communication engineers, Matsui, (Jul. 1996), pp. 35–48.

(List continued on next page.)

*Primary Examiner*—Gilberto Barron
(74) *Attorney, Agent, or Firm*—Birch, Stewart, Kolasch & Birch, LLP

(57) ABSTRACT

The present invention can be applied to a cipher processing apparatus, which includes a function F having a configuration of repeating process and inside of the function F, a function f having a configuration of repeating process is included. According to the invention, the cipher processing apparatus is configured by registers 301 through 303 for temporarily holding data, selectors A through C, 311 through 313, and a function f operating circuit 323 for transforming data. An output data from the function f operating circuit 323 is held in the register C 303, and the selector C 313 selects either to repeat the data transformation by the function operating circuit 323 or not. When a cipher processing apparatus includes a function F having a configuration of repeating process and inside of the function F, a function f having a configuration of repeating process is included, the cipher processing apparatus can be embodied efficiently, which enables to reduce the circuit scale and to save electric power.

15 Claims, 18 Drawing Sheets

OTHER PUBLICATIONS

Lecture Notes in Computer Science 1039, Fast Software Encryption FSE' 96, Matsui, pp. 205–218.
Lecture Notes in Computer Science 1267, Fast Software Encryption FSE' 97, Matsui, pp. 54–68.
Lecture Notes in Computer Science 740, Advances in Cryptology–CRYPTO'92, Eberle, pp. 521–539.
SCIS'98, The 1998 Symposium on Crytography and Information Security, Ichikawa, et al, pp. 1–6.
SCIS'96, The 1996 Symposium on Cryptography and Information Security, Matsui, et al, pp. 1–14.
Information Security System Development Center, Matsui, pp. 205–218. Undated.
IEICE Transactions, vol. E 74, No. 8, Aug, 1991, Morita, et al, pp. 2143–2152.
Journal or the Information processing Society of Japan, vol. 25, No. 6, 1984, Akiyama, et al, pp. 1–5, and figures.
Patent Abstracts of Japan, Publication No. 06075525A, U.S. 5,301,235 published Mar. 18, 1994.
Patent Abstracts of Japan, Publication No. 08179690A, U.S. 5,687,238 published Jul. 12, 1996.
Mitsuri Matsui, "On Provable Security Against Differential and Linear Cryptananlysis of Block Ciphers, Preliminary Reports from the 18th Symposium of Information Theory and its Application", Society of Information Theory and its Application, Oct. 1995, vol. 1 of 2, pp. 175–178 (in Japanese with English translation attached).
NEC, Mitsubishi Electric Corporation Has Developed Particular Cipher Algorithm, Nikkei Electronics, Nikkei BP, No. 648, Nov. 6, 1995, pp. 20–21 (in Japanese with English translation attached).
"What is Common Key Block Cipher? Would you be kind to tell me about MISTY Ciphers", Electronics, Ohm, May 1996, p. 67 (in Japanese with English translation attached).
"Cycroptographics in the Internet Age", Nikkei Electronics, Nikkei BP, Nol 658, Mar. 25, 1996, pp. 223–241, esp. pp. 236–240 (in Japanese with English translation attached).
Mitsuru Matsui—"Linear Cyrptanalysis Method for DES Cipher", EUROCRYPT' 93, Lecture Notes in Computer Science, Springer–Verlag, 1993, vol. 765, pp. 386–397 (in English).
Mitsuru Matsui—"A New Cyrptanalytic Method for FEAL Cipher", IEICE Transactions on Fundamentals of Electronics, Communications and Computer Sciences, IEICE, Jan. 1994, vol. E77–A, pp. 63–69 (in English).
Koyama K. et al.—How to Strengthen DES–like Cyrptosystems Against Differential Cryptanalysis, IEICE, Jan. 1994, vol. E77–A, pp. 2–7 (in English).
H. Matsumoto et al—"The FEAL Encryption Processor for Multi–media Communications", NTT R & D vol. 41, No. 1 6, 1992, NTT Human Interface Laboratories Nippon Denshin Denwa Kabushiki Kaisha, pp. 777–785 (in Japanese with English translation).

* cited by examiner

CIPHER PROCESSOR, IC CARD AND CIPHER PROCESSING METHOD

This application is the national phase under 35 U.S.C. §371 of prior PCT International Application No. PCT/JP98/01898 which has an International filing date of Apr. 24, 1998 which designated the United States of America.

TECHNICAL FIELD

The present invention relates to a cipher processing apparatus, in particular, to a small-sized cipher processing apparatus installed in an IC (Integrated Circuit) card and so on.

BACKGROUND ART

For a conventional related art of the invention, DES (Data Encryption Standard) of U.S. commercially used cipher, which is a block cipher of secret key (common key) cryptosystem, will be explained.

A detail of DES processing is described in Hans Eberl "A High-speed DES implementation for Network Applications", Advances in Cryptology—CRYPTO '92, Lecture Notes in computer Science 740, Springer-Verlag.

FIG. 18 is a flowchart showing DES encryption algorithm.

In FIG. 18, reference numerals 1001–1004 show operations using function F for data transformation. Reference numerals 1011–1014 show XOR operations bit by bit. In the figure, an initial permutation and a final permutation are omitted.

An operation will be explained.

An input data 1050 having 2×n bits (in case of DES, 2×32 bits) is divided into two n-bit data 1051 and 1052. The n-bit data 1051 is output as n-bit data 1053 without any transformation. The data 1051 is also input to the function F 1001 to be transformed. The data transformed by the function F 1001 is XORed with the other n-bit data 1052 bit by bit by the XOR operation 1011 and the XORed result is output as n-bit data 1054.

Hereinafter, operations are repeated by the functions F 1002, 1003, and 1004, the XOR operations 1012, 1013, and 1014 and output data 1055 and 1056 are output. The two n-bit data are united and output as 2n-bit data 1057.

FIG. 19 shows an example of cipher processing apparatuses performing data transformation similar to the DES encryption as shown in the flowchart of FIG. 18.

In FIG. 19, reference numerals 1101 and 1102 show registers A and B for holding data. Reference numerals 1103 and 1104 are selectors A and B for selecting one of data. 1105 denotes a function F operating circuit for calculating the function F as data transformation. 1106 denotes an XOR circuit. 1201 and 1202 respectively show n-bit input data A and B. 1203 and 1204 respectively show n-bit output data A and B.

An operation will be explained.

An input data having 2×n bits (in case of DES, 2×32 bits) is divided into two n-bit input data A1201 and B1202. The two input data are respectively selected by the selectors A1103 and B1104 and held in the registers A1101 and B1102. The data held in the register A1101 is fed back to the selectors A1103 and B1104 and input to the function F operating circuit 1105 at the same time. After transformed by the function F operating circuit 1105, the data is XORed by the XOR circuit 1106 with the data held in the register B1102. The XORed result is fed back to the selectors A1103 and B1104.

Next, the selector A1103 selects the XORed result of the XOR circuit 1106, the selector B selects data held in the register A1101, and the registers A1101 and B1102 are respectively updated by these selected data to hold therein. Then, similarly, the operation, corresponding to the operation through the functions F 1002, 1003, 1004 and the XOR circuits 1012, 1013, 1014 shown in FIG. 18, is repeated (looped) a necessary number of times, and the output data A1203 and B1204 are finally output. In case of DES, the operation will be repeated 16 times.

In a cipher processing apparatus by the above method, when the apparatus is constructed by a plurality of the functions F having similar configuration for processing, it is possible to efficiently construct a processing circuit repeatedly. This enables to reduce the circuit scale and also save electric power. However, there is a problem that when the function F includes a smaller circuit having repeating process, the conventional configuration of the cipher processing apparatus does not efficiently reduce the circuit scale or save electric power.

The present invention is provided to solve the above-mentioned problem. An objective of the invention is to provide a cipher processing apparatus, which can be constructed efficiently to reduce a circuit scale and save electric power even if the apparatus has a configuration of repeatedly processing the function F including an internal smaller circuit configured by repeating process.

Disclosure of the Invention

According to the present invention, in a cipher processing apparatus performing a first data transformation process on an input data a plurality of times by a first operating circuit, the first operating circuit comprises a loop processing circuit for performing a second data transformation process a plurality of times;

the loop processing circuit comprises a second operating circuit, a data holding circuit, and a selecting circuit to form a processing loop;

the second operating circuit performs the second data transformation process;

the data holding circuit tentatively holds the data on which the second data transformation process was performed; and the selecting circuit selects one of to terminate and to continue the second data transformation process by the loop processing circuit.

The second operating circuit comprises:

a data dividing circuit dividing data input to the second operating circuit into a first divided data and a second divided data;

a third operating circuit transforming the first divided data;

an XOR circuit XORing an output data from the third operating circuit with the second divided data bit by bit; and a data uniting circuit uniting an output data from the XOR circuit and the second divided data.

The selecting circuit inputs a data for the first data transformation process by the first operating circuit and a data held in the data holding circuit, and the selecting circuit selects the data held in the data holding circuit when a process by the loop processing circuit is to be continued.

The selecting circuit selects the data for the first data transformation process by the first operating circuit when a process by the processing loop circuit starts.

The cipher processing apparatus further comprises:

a register A and a register B alternately holding the data for the first data transformation by the first operating circuit;

two XOR circuits XORing bit by bit the data on which the first data transformation was performed by the first operating circuit with the data held in the register A and with the data held in the register B, respectively;

a selector A and a selector B selecting one of the data on which the first data transformation was performed by a first operating unit and an XORed data by the XOR circuit to hold in the register A and the register B, respectively; and the selecting circuit alternately selects the register A and the register B to start the process of the loop processing circuit.

The first operating circuit further performs a data transformation different from the second data transformation process for the data on which the second data transformation was performed by a processing loop unit to output a transformed data.

The second operating circuit comprises:

m (m≧1) number of function operating circuits inputting identical data from the selecting circuit; and a selector with m inputs and one output for inputting data operated by the m number of function operating circuits and selecting one of the input data.

The cipher processing apparatus further comprises:

a function operating unit transforming data output from the selecting circuit; and a selector inputting data operated by the function operating unit and the data output from the selecting circuit, and outputting one of the data.

According to the present invention, in a cipher processing method performing a first data transformation for an input data a plurality of times by a first operating step, the first operating step comprises a loop processing step performing a second data transformation at a plurality of times;

the loop processing step comprises:

a second operating step performing the second data transformation;

a data holding step temporarily holding data on which the second data transformation was performed; and a selecting step for selecting either of to terminate and to continue the second data transformation by the loop processing step.

The second operating step comprises:

a data dividing step dividing data input to the second operating step into a first divided data and a second divided data;

a third operating step transforming the first divided data;

an XOR step XORing an output data from the third operating step with the second divided data bit by bit; and a data uniting step uniting an output data from the XOR step and the second divided data.

According to the present invention, an IC (integrated circuit) card communicating data with a reader/writer comprises:

a data receiving circuit receiving the data from the reader/writer;

a data transmitting circuit transmitting the data to the reader/writer; and the cipher processing apparatus of the invention encrypting/decrypting the data.

According to the present invention, an IC card communicating data with a reader/writer comprises:

a data receiving circuit receiving the data from the reader/writer;

a data transmitting circuit transmitting the data to the reader/writer; and the cipher processing apparatus of the invention encrypting/decrypting the data.

Best Mode for Carrying out the Invention

Embodiment 1

A cipher processing apparatus according to one embodiment of the present invention will be explained referring to FIGS. 1 through 3.

Figure 1:
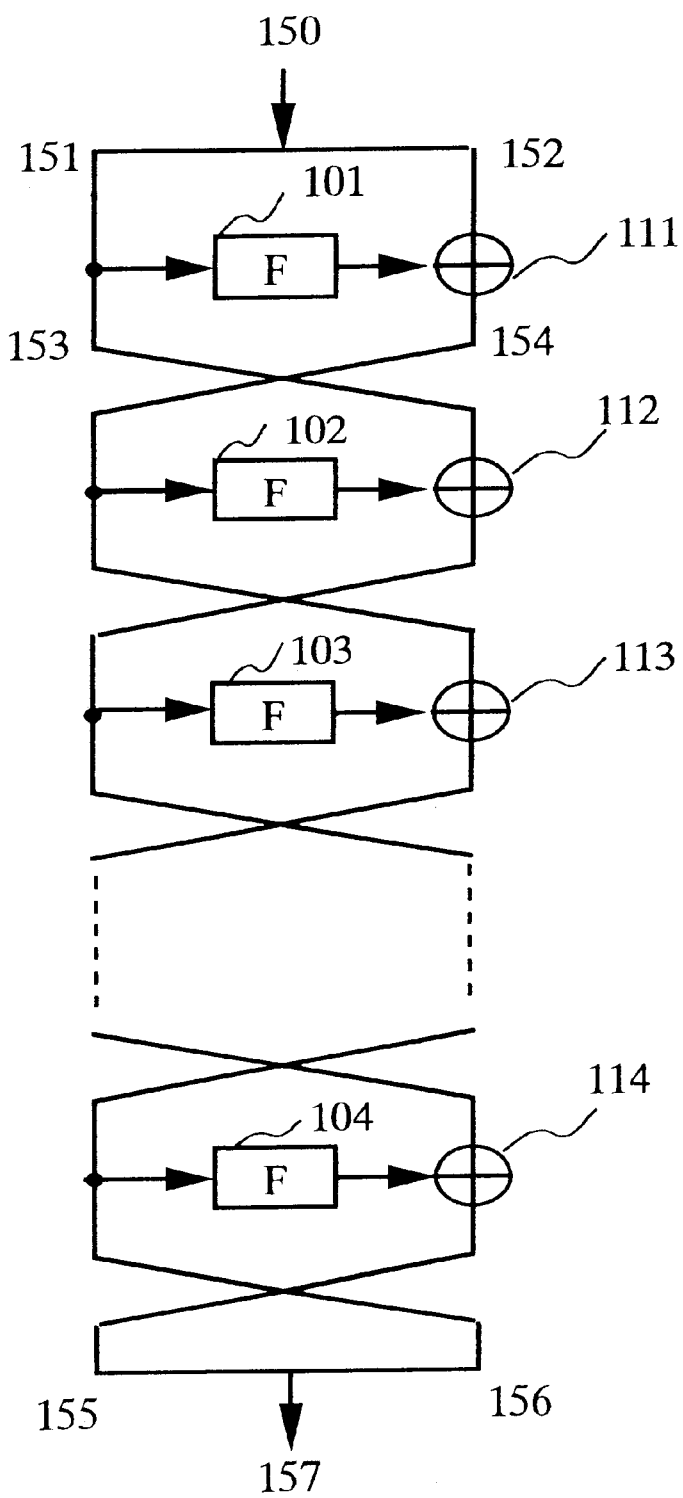
FIG. 1 shows an encryption algorithm in relation to a first embodiment of the present invention.

FIG. 1 is a flowchart showing an encryption algorithm of a cipher processing apparatus according to one embodiment of the present invention.

In FIG. 1, reference numerals 101 through 104 show operations using functions F for data transformation, and reference numerals 111 through 114 show XOR operations bit by bit.

Figure 2:
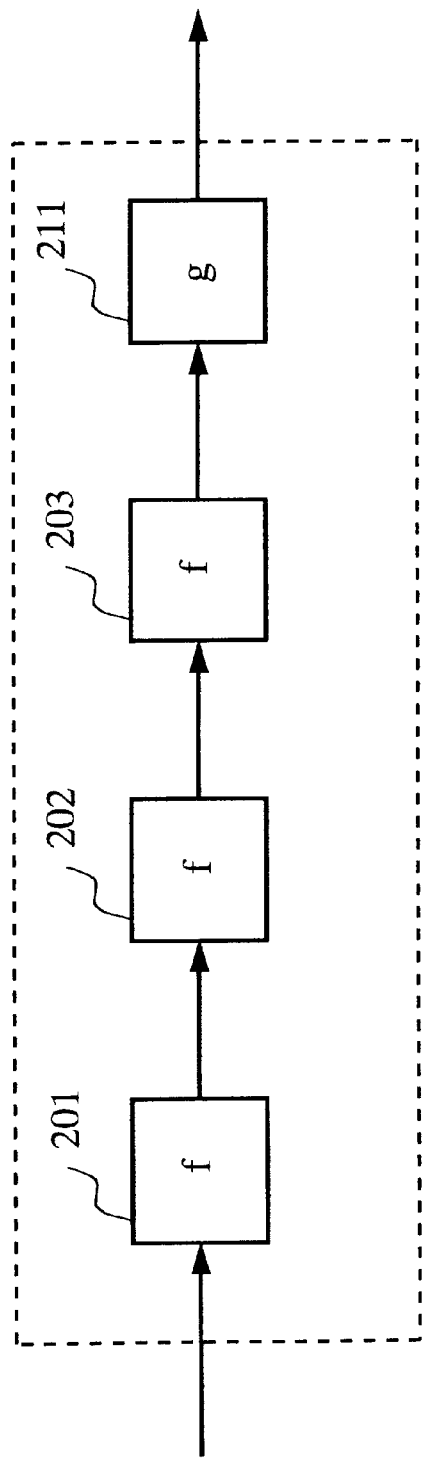
FIG. 2 shows a configuration of a function used for an encryption algorithm in relation to the first embodiment of the present invention.

FIG. 2 shows a configuration of operation using the function F, which is configured by three operations using functions f 201 through 203 and an operation using a function g 211.

An operation will be described hereinafter.

An input data 150 having 2×n bits is divided into two, namely, n-bit data 151 having upper digits of the input data and n-bit data 152 having lower digits of the input data. The n-bit data 151 is output as n-bit data 153 without any transformation, and the n-bit data 151 is also transformed by the function F 101. The output data from the function F 101 is XORed with another n-bit data 152 by the XOR circuit 111 bit by bit and n-bit data 154 is output. In the function F, three operations using the functions f 201 through 203 are performed, an operation using the function g 211 is then performed and the result is output.

Then, similarly, operations are repeated through the functions F 102, 103, 104, and XOR circuits 112, 113, 114 and n-bit data 155, 156 are output. The two n-bit data are united and output as 2n-bit data 157.

Figure 3:
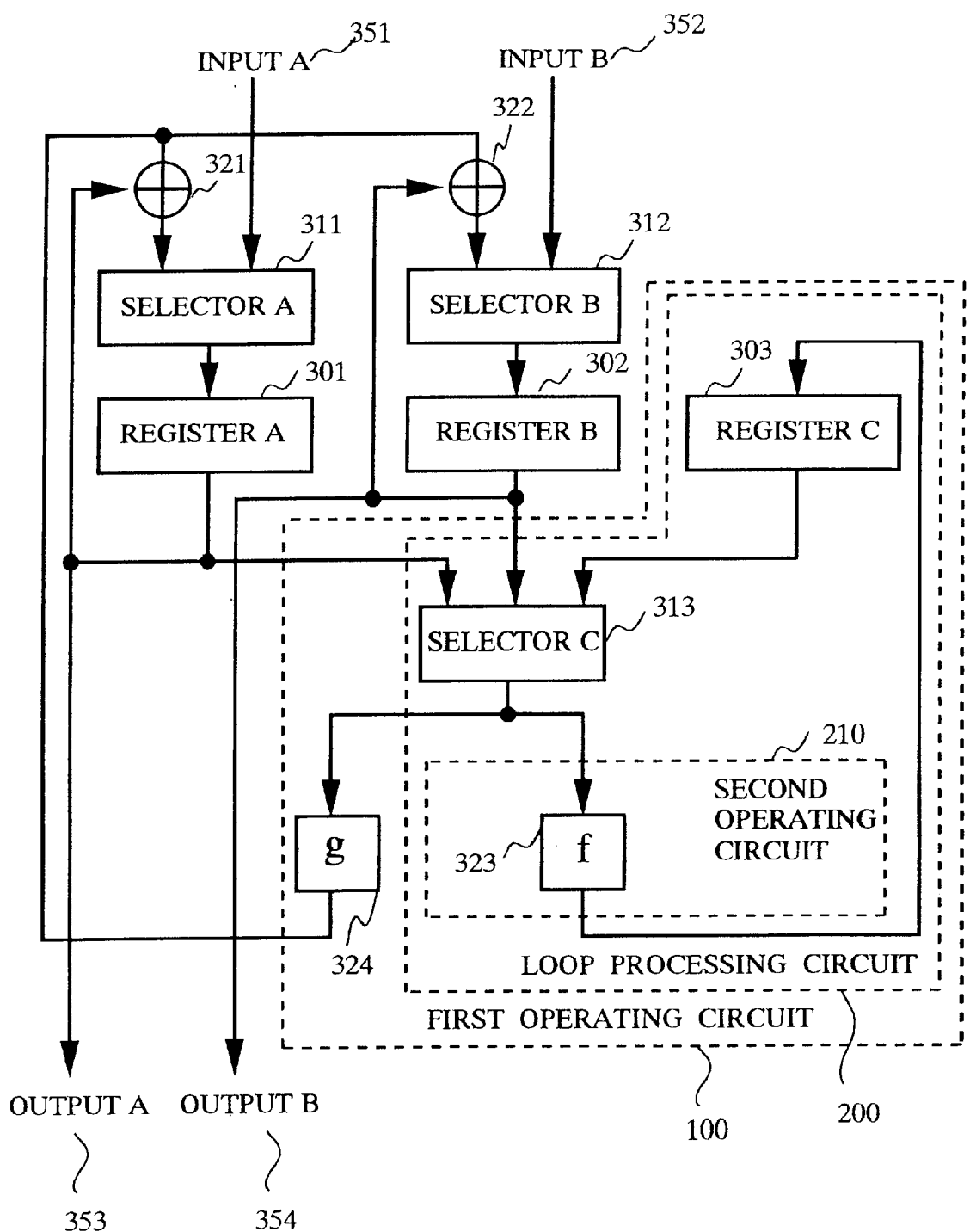
FIG. 3 is a block diagram showing a basic configuration of a cipher processing apparatus according to the first embodiment of the invention.

FIG. 3 shows a general configuration of the cipher processing apparatus embodying the algorithm for data transformation explained by referring to FIGS. 1 and 2.

In FIG. 3, reference numerals 301, 302 and 303 respectively show a register A, a register B and a register C. Reference numerals 311, 312 and 313 respectively show a selector A, a selector B and a selector C. 321 and 322 denote bit by bit XOR circuits. 323 denotes a function f operating circuit, which is one of configurational elements performing the function F operation. 324 denotes a function g operating circuit, which is one of configurational elements performing the function F operation.

The register C 303, the selector C 313, the function f operating circuit 323 and the function g operating circuit 324 form a first operating circuit 100. The register C 303, the selector C 313, the function f operating circuit 323 form a loop processing circuit 200.

Figure 4:
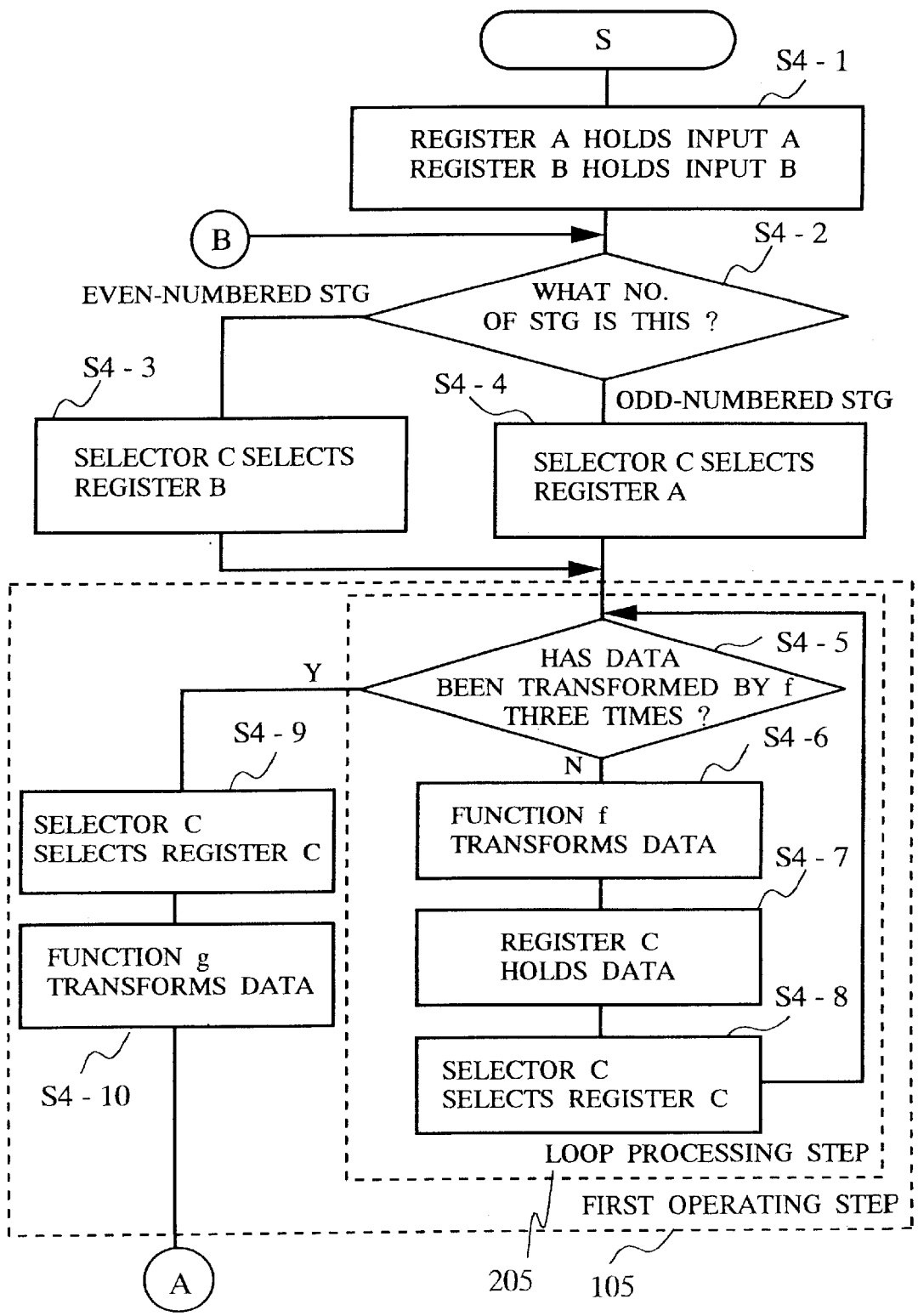
FIG. 4 is a flowchart showing one example of basic operations of the cipher processing apparatus according to the first embodiment of the invention.
Figure 5:
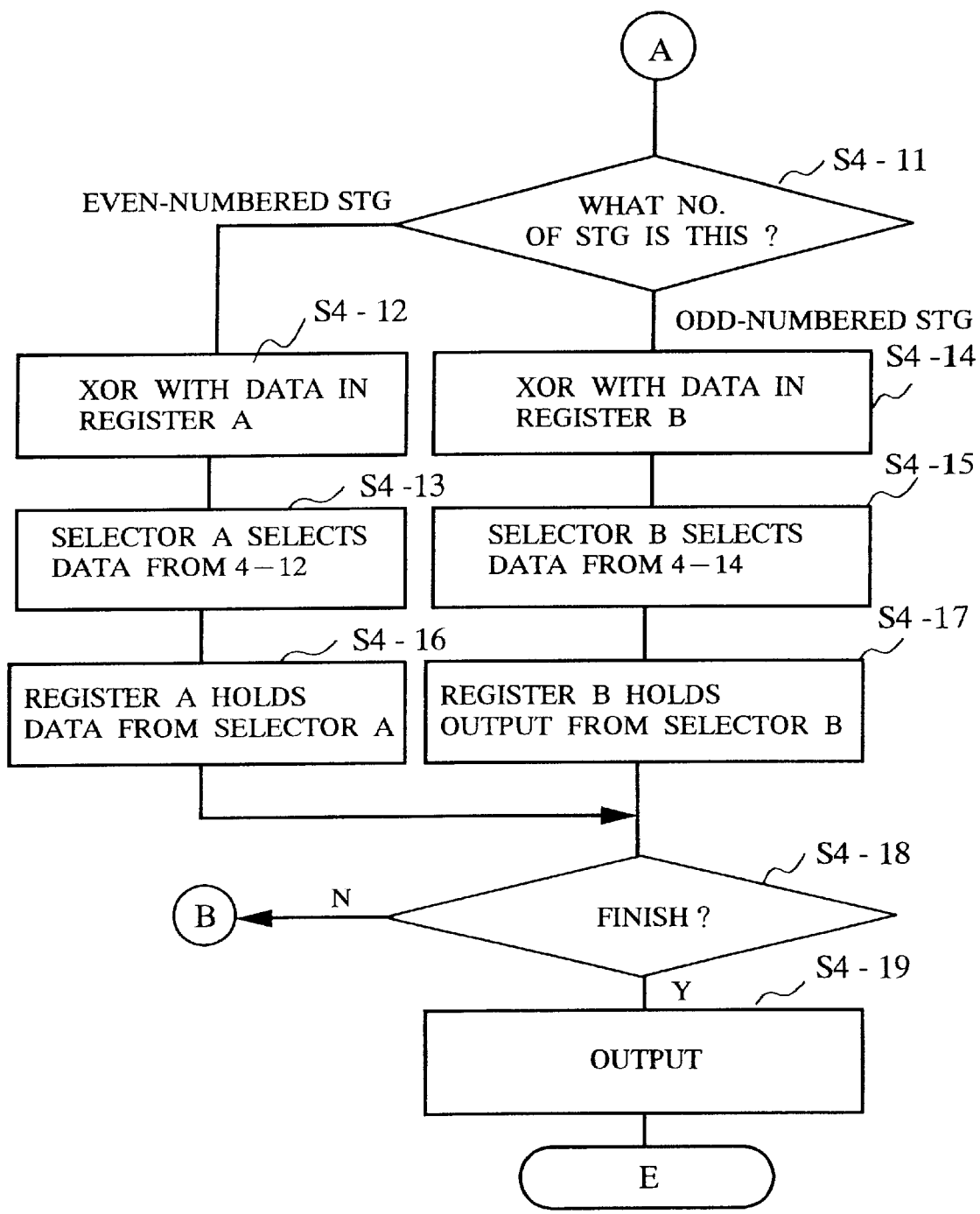
FIG. 5 is a flowchart showing one example of basic operations of the cipher processing apparatus according to the first embodiment of the invention.

FIGS. 4 and 5 are flowcharts showing an operation of the circuits shown in FIG. 3.

The operation will be explained by referring to FIGS. 4 and 5.

The operation by the function F is performed by three-times operation of the function f operating circuit and once operation of the function g operating circuit.

Data transformation at a first stage shown in FIG. 1 will be explained.

An input data having 2×n bits is divided into two n-bit data, namely, an input data A 351 and an input data B 352. The input data are selected by the selector A 311 and the selector B 312, and held in the register A 301 and the register B 302 (at step 4-1).

Then, in the selector C 313, it is detected whether this is a process of an odd-numbered stage or a process of an even-numbered stage (at step 4-2), the data held in the register A 301 is selected (at step 4-4), and the selected data is transformed by the function f operating circuit 323 (at step 4-6) The output data from the function f operating circuit 323 is held in the register C 303 (at step 4-7). A first operation by the function f operating circuit ends with this step.

Then, in the selector C 313, the data held in the register C 303 is selected (at step 4-8), and the selected data is transformed by the function f operating circuit 323 (at step 4-6). The data output from the function f operating circuit 323 is held in the register C 303 (at step 4-7). With this step, a second operation by the function f operating circuit ends.

Further, in the selector C 313, the data held in the register C 303 is selected (at step 4-8). The selected data is transformed by the function f operating circuit 323 (at step 4-6), and the transformed data is held in the register C 303 (at step 4-7). With this step, a third operation by the function f operating circuit 323 ends.

Next, in the selector C 313, the data held in the register C 303 is selected (at step 4-9). The selected data is transformed by the function g operating circuit 324 and the result is output (at step 4-10). With this step, a whole operation by the function F terminates.

Next, it is detected whether this is a process of an odd-numbered stage or a process of an even-numbered stage (at step 4-11), the data output from the function g operating circuit 324 is fed back to be XORed with the data held in the register B 302 by the XOR circuit 322 (at step 4-14). The XORed data is selected by the selector B 312 and the selected data is held in the register B 302 (at step 4-15). This step completes the first stage of the data transformation.

If an even-numbered stage is detected (at step 4-2), the selector C 313 selects the data held in the register B 302 (at step 4-3). Then, the selected data is transformed by the function f operating circuit 323 (at step 4-6), and the output data is held in the register C 303 (at step 4-7). A first operation by the function f operating circuit ends with this step.

Then, in the selector C 313, the data held in the register C 303 is selected (at step 4-8), and the selected data is transformed by the function f operating circuit 323 (at step 4-6). The data output from the function f operating circuit 323 is held in the register C 303 (at step 4-7). With this step, a second operation by the function f operating circuit 323 ends.

Further, in the selector C 313, the data held in the register C 303 is selected (at step 4-8). The selected data is transformed by the function f operating circuit 323 (at step 4-6), and the transformed data is held in the register C 303 (at step 4-7). With this step, a third operation by the function f operating circuit 323 ends.

Next, in the selector C 313, the data held in the register C 303 is selected (at step 4-9). The selected data is transformed by the function g operating circuit 324 and the result is output (at step 4-10). With this step, a whole operation by the function F circuit terminates.

Next, it is detected to be a process of an even-numbered stage (at step 4-11), the data output from the function g operating circuit 324 is fed back to be XORed with the data held in the register A 301 by the XOR circuit 321 (at step 4-12). The XORed data is selected by the selector A 311 and the selected data is held in the register A 301 (at step 4-13). This step completes the second stage of the data transformation.

Hereinafter, similar processes to the first stage of the data transformation and the second data transformation will be alternately repeated a necessary number of times.

Finally, the data held in the registers A 301 and B 302 are output as output data A 353 and output data B 354 as a result of the data transformation of the final stage (at step 4-19).

As has been described, according to this invention, the one function f operating circuit 323 can be used repeatedly by providing the register C 303 and the selector C 313. The cipher processing apparatus does not need to include three function f operating circuits, but need to include only one function f operating circuit 323, which reduces a circuit scale.

Especially, the function F (the function f, the function g), used for the data transformation for cipher processing, is known to have an extremely complex configuration because the data transformation for cipher processing requires to use a function being strong against cryptanalysis. Hence, the reduction of the circuit scale according to the present invention effects a lot to the data transformation for cipher processing.

According to the invention, it is not always required to operate the register A 301, the register B 302, the register C 303, the selector A 311, the selector 312, and the selector C 313. The processes can be performed with these circuits operating only when required, which enables the apparatus to save electric power.

Accordingly, this invention takes a great effect when applied to a small apparatus such as an IC card. The invention can be applied not only to the IC card, but also to a reader/writer for the IC card.

Figure 6:
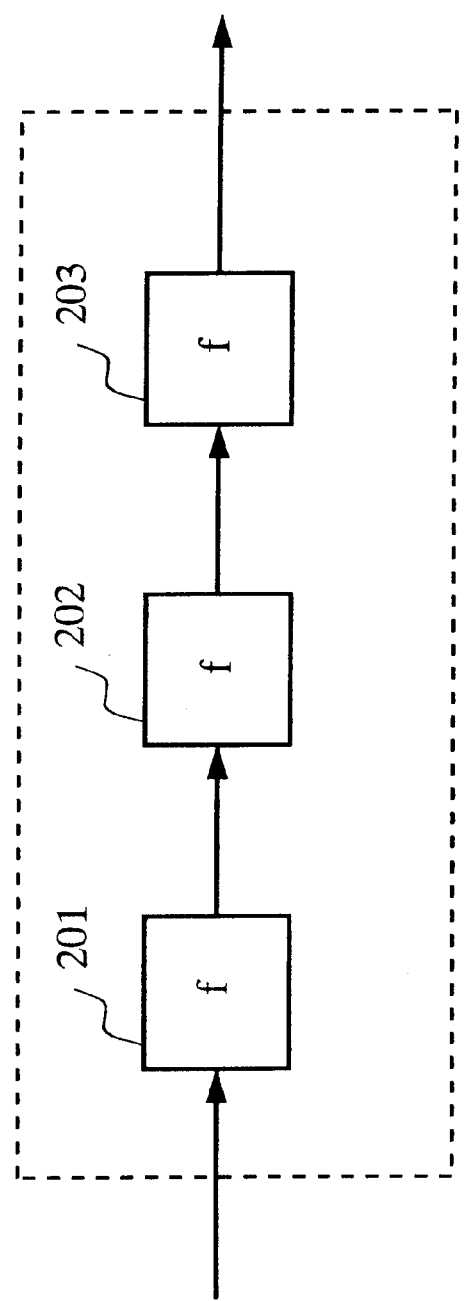
FIG. 6 shows a configuration of the function used for an encryption algorithm in relation to the first embodiment of the present invention.
Figure 7:
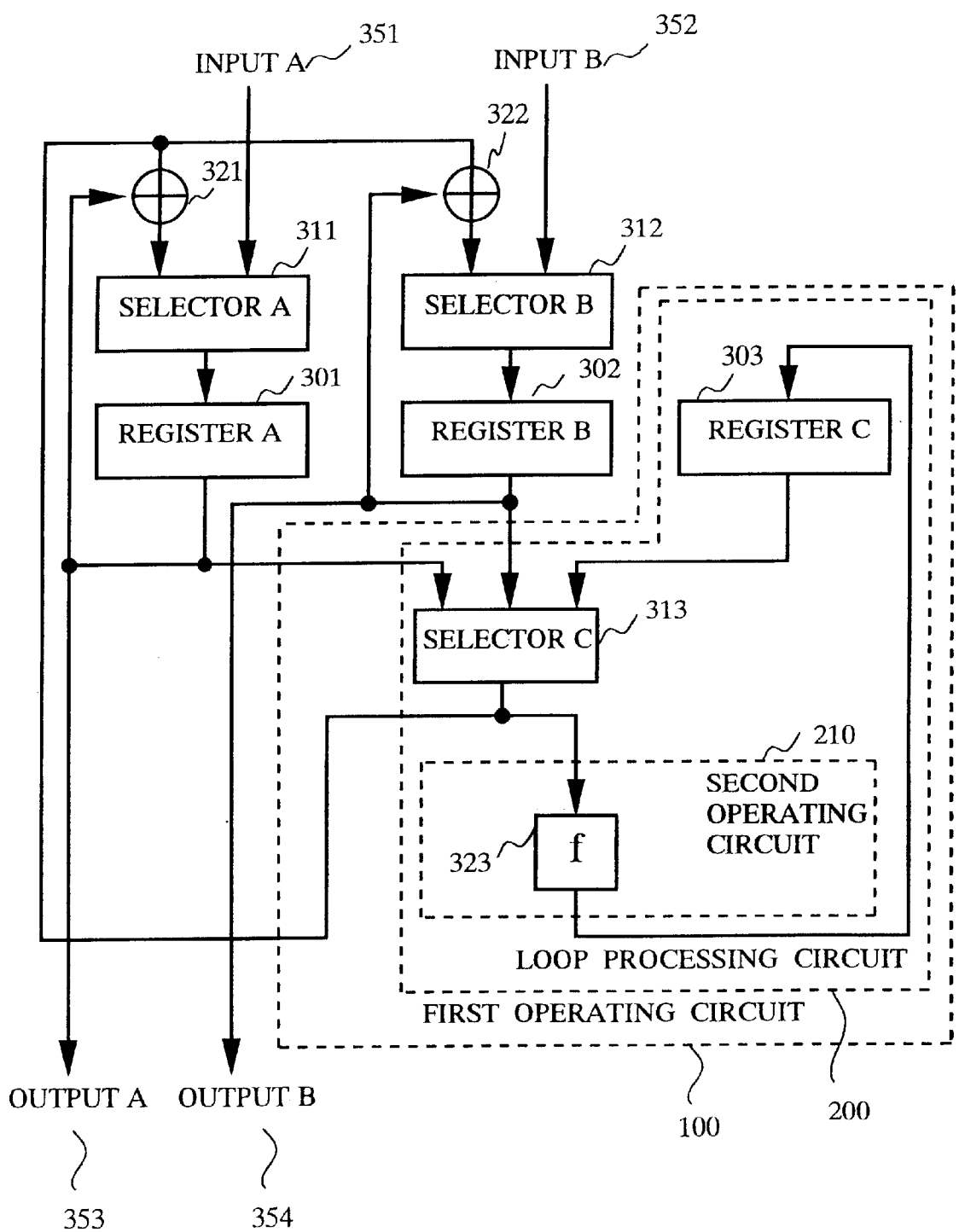
FIG. 7 shows the encryption algorithm according to the first embodiment of the present invention.

The function F is not limited to have the above configuration. For example, when the function F is configured by only repeating the operation of function f as shown in FIG. 6, the function g is not needed for the configuration of FIG. 3. In this case, the data selected by the selector C 313 is directly fed back as shown in FIG. 7.

Figure 8:
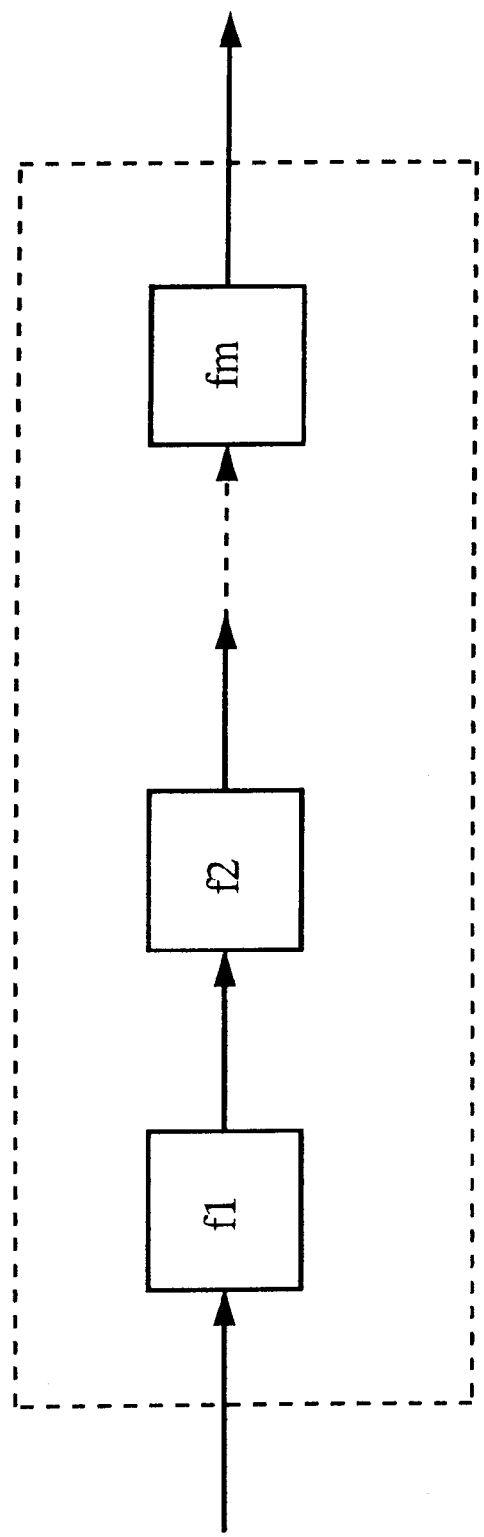
FIG. 8 shows a configuration of the function used for the encryption algorithm according to the first embodiment of the present invention.
Figure 9:
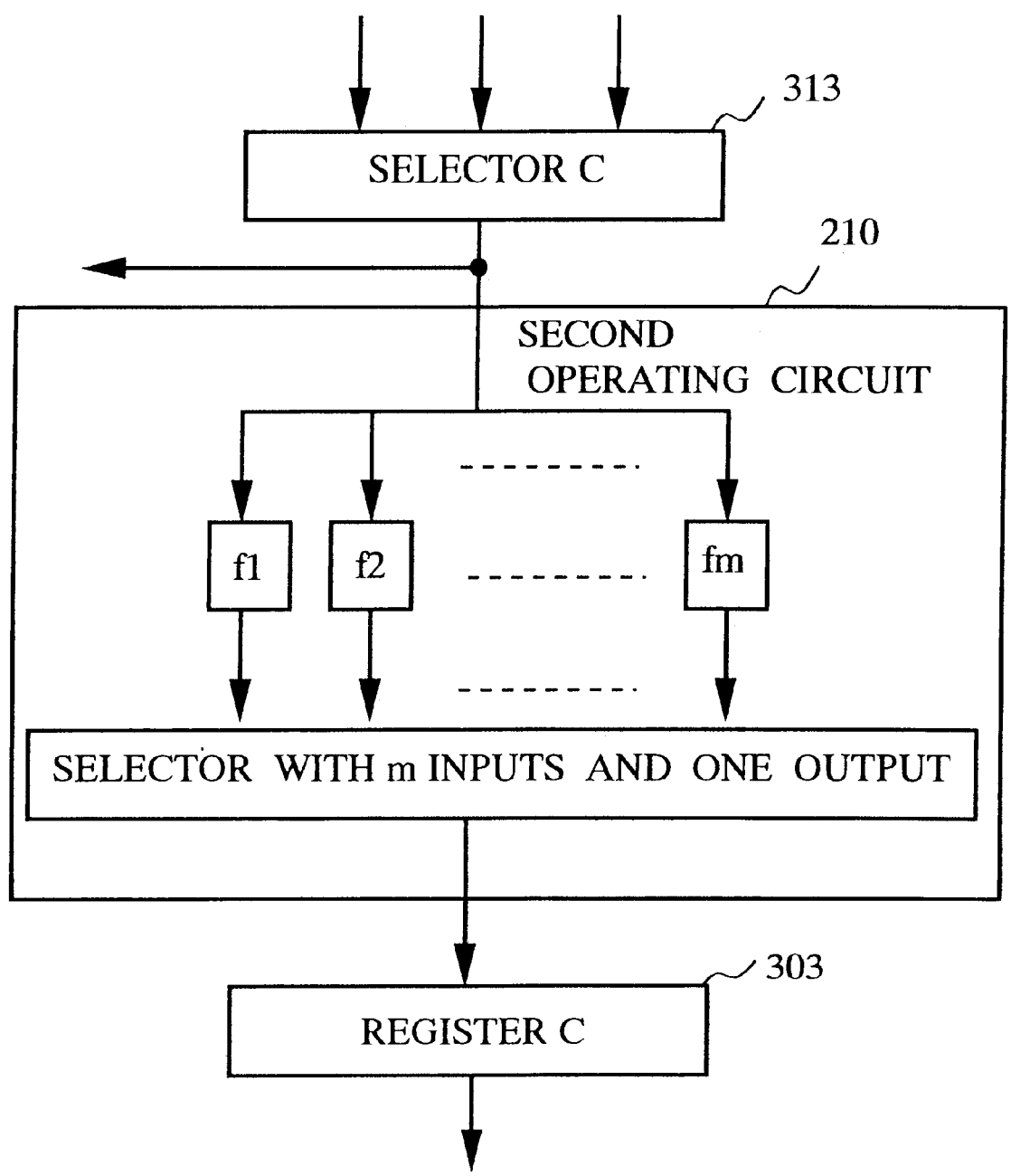
FIG. 9 is a block diagram showing a configuration of a second operating circuit according to the first embodiment of the present invention.

When the function f operating circuit 323 includes m (m≧1) number of functions, which constitute in an arbitrary order, as shown in FIG. 8, the m number of functions are aligned in parallel at a place corresponding to the function f operating circuit 323 of FIG. 3. The data is input to each of the m number of functions from the selector C 313, the output data from the m number of functions are input to the selector with m number of inputs and one output, and the selector selects one output data to be held in the register C 303 as shown in FIG. 9. These operations are repeated a number of times corresponding to an arbitrary order of the m number of functions.

Embodiment 2

A cipher processing apparatus according to another embodiment of the present invention will be explained referring to FIGS. 10 through 14.

Figure 10:
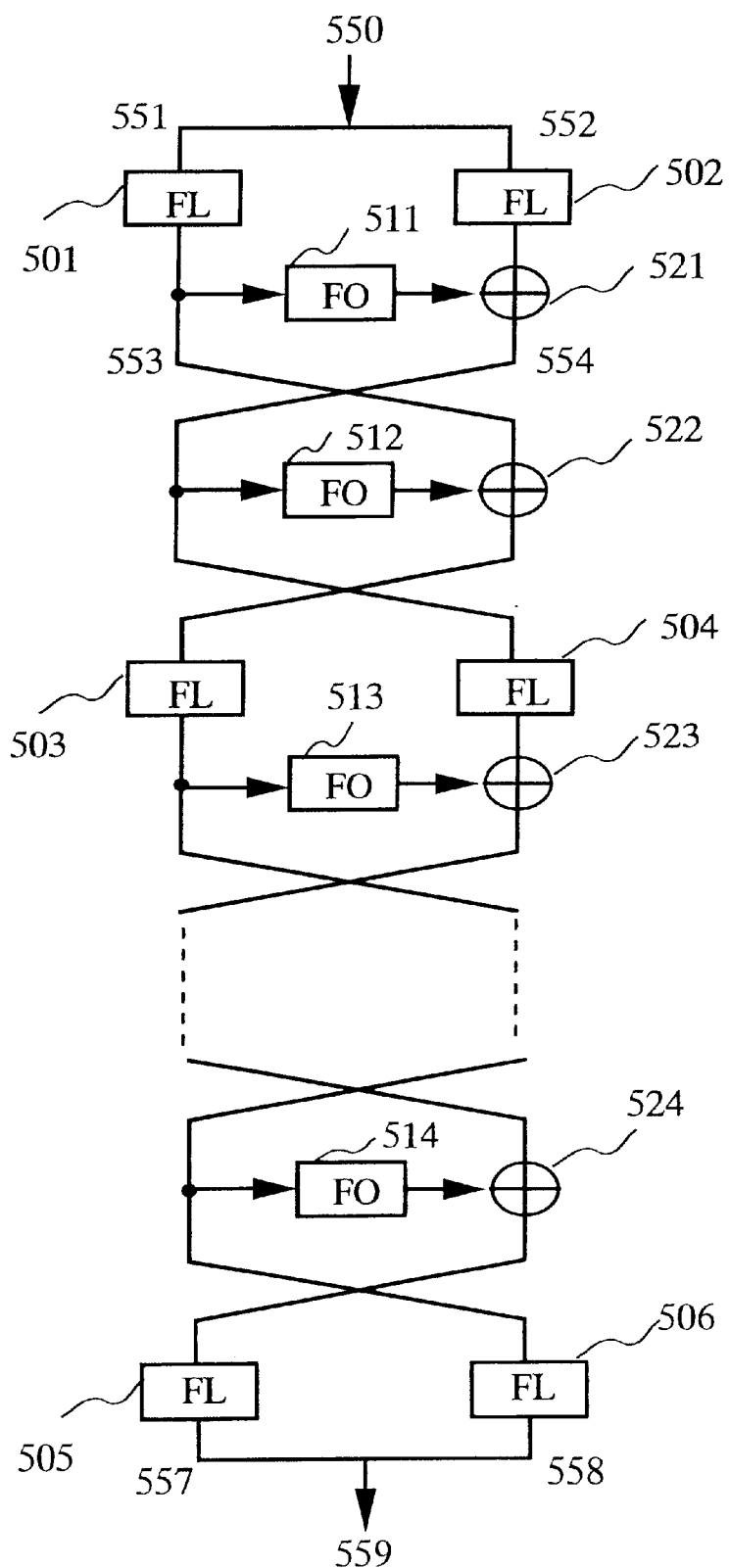
FIG. 10 shows an encryption algorithm in relation to a second embodiment of the present invention.

FIG. 10 shows a flowchart of MISTY encryption algorithm.

Details of MISTY is disclosed in, for example, Mitsuru Matsui "Block Encryption Algorithm MISTY", the Institute of Electronics, Information and Communication Engineers, Technical Report ISEC 96-11 (1996-07).

In FIG. 10, reference numerals 501 through 506 denote operations by functions FL, reference numerals 511 through 514 denote operations by functions FO, and 521 through 524 are XOR operations.

Figure 11:
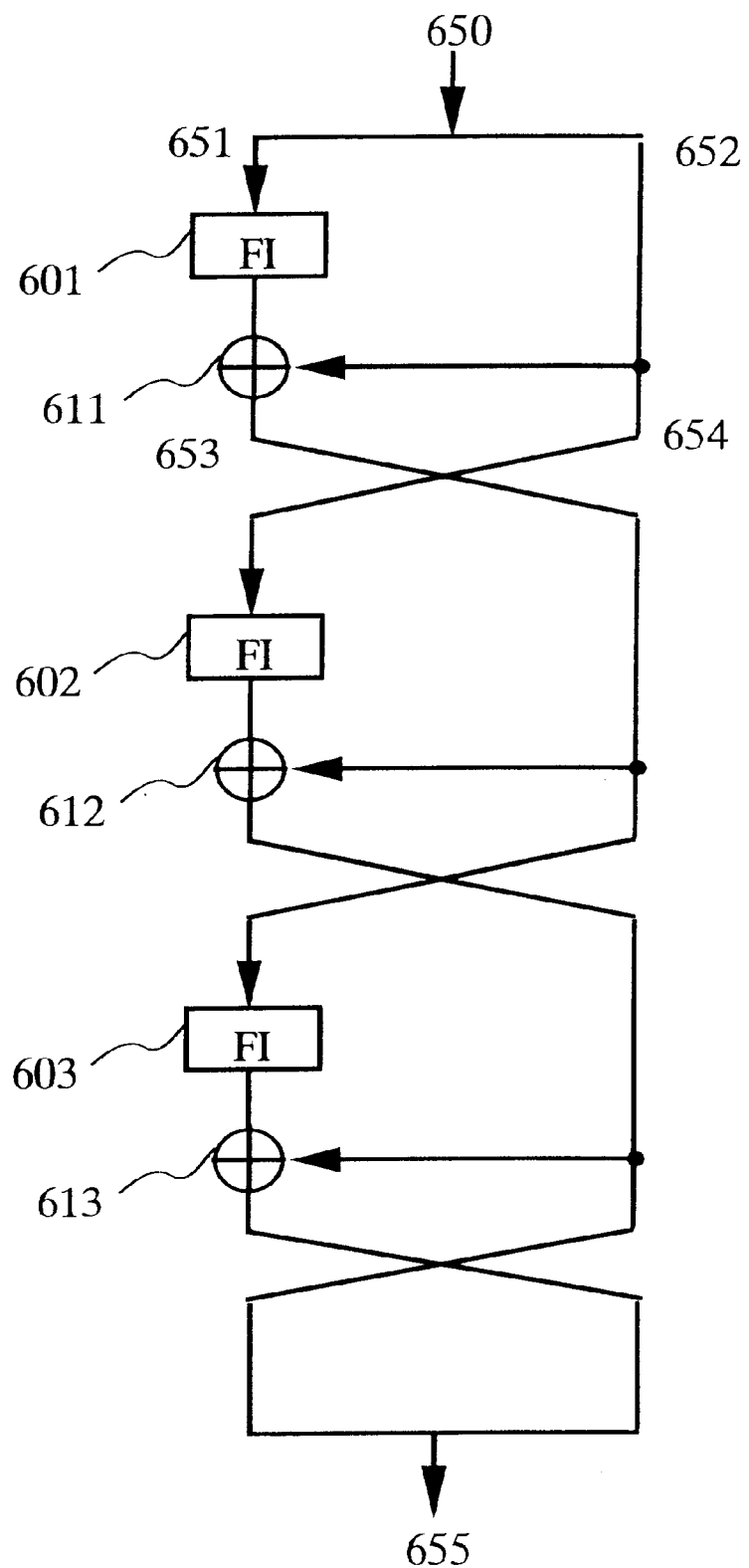
FIG. 11 shows a configuration of a function used for the encryption algorithm according to the second embodiment of the present invention.

FIG. 11 shows operations using the functions FO 511 through 514 of FIG. 10.

As shown in FIG. 11, in MISTY algorithm, transformation process, including functions FI 601 through 603 and XOR operations 611 through 613, is repeated three times as operations by the functions FO 511 through 514.

Figure 12:
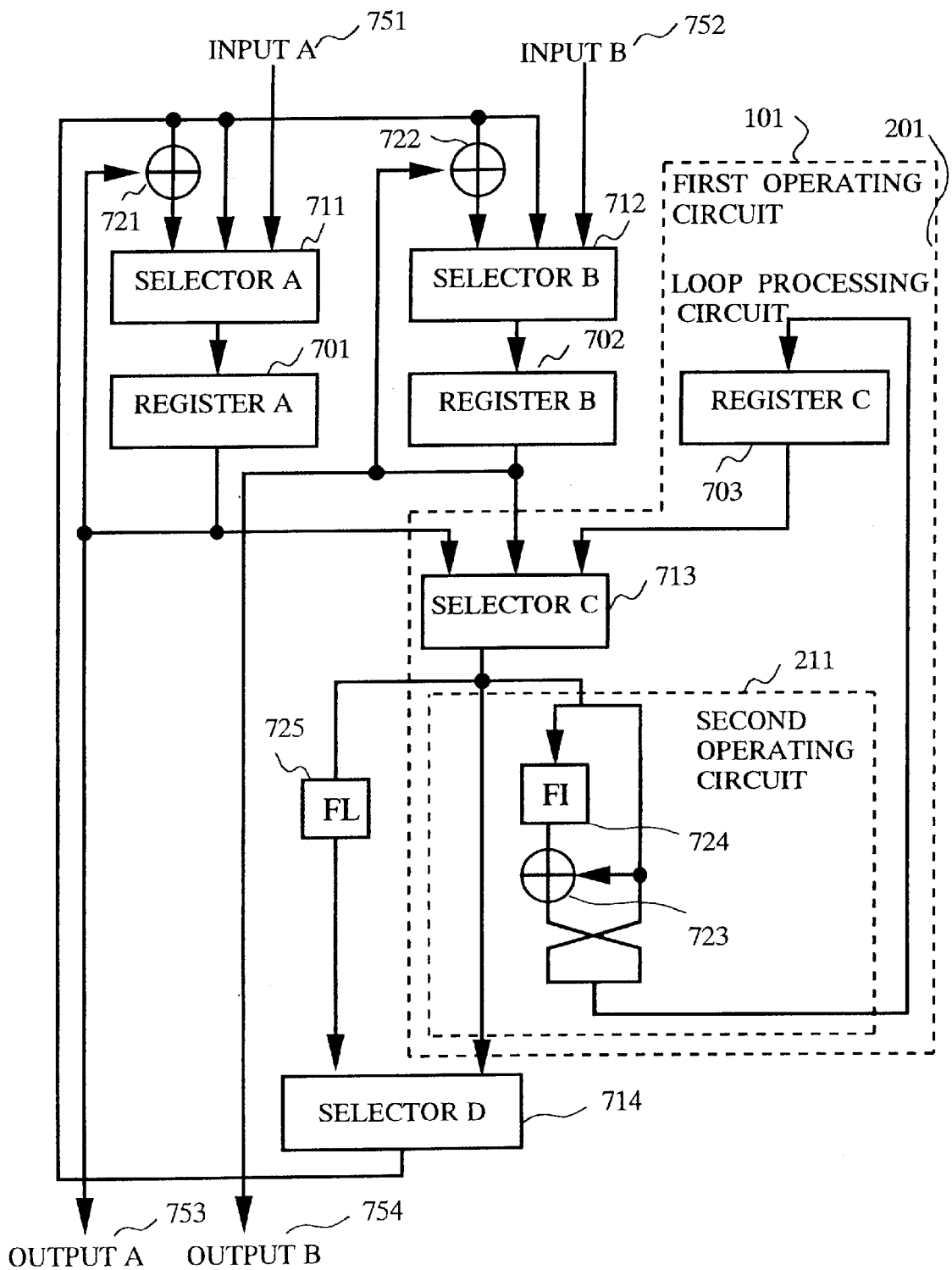
FIG. 12 is a block diagram showing a basic configuration of a cipher processing apparatus according to the second embodiment of the invention.

FIG. 12 shows one embodiment of a cipher processing apparatus applying the data transformation process of MISTY of FIGS. 10 and 11 according to the present invention.

In the following, an operation of the encryption algorithm of FIGS. 10 and 11 will be explained.

An input data 550 having 2×n bits is divided into two n-bit data, one having upper n digits of the input data 550 and the other having lower n digits of the input data 550, and the two divided data are input as an input data A 551 and an input data B 552. In case of MISTY, n=32. After transformed by the function FL 501, the n-bit input data 551 is output as n-bit data 553, and is also transformed by the function FO 511. The other n-bit input data 552 is transformed by the function FL 502. The data transformed by the function FO 511 is XORed bit by bit by the XOR operation 521 with the output data from the function FL 502, and n-bit data 554 is output. In the function FO, operations by the functions FI 601 through 603 and the XOR operations 611 through 613 are performed. Namely, the input 2m-bit data (n bits) 650 is divided into two m-bit data 651 and 652. After transformed by the function FI, the data 651 is XORed bit by bit by the XOR operation 611 with the data 652, and the XORed result is output as data 653. The data 652 is output as data 654 without any transformation. Hereinafter, the above operations are repeated in three stages. Finally, two m-bit data are united and output as 2m-bit (n bits) data 655.

Next, an operation at a second stage will be described.

The output data 554 supplied from the first stage is output without any transformation, and at the same time, is transformed by the function FO 512. The output data from the function FO 512 is XORed bit by bit by the XOR operation 522 with the other n-bit data 553, and the XORed result is output.

Hereinafter, data transformation similar to the process of the first and second stages is repeated a necessary number of times, and n-bit data 557 and 558 are output. Finally, the output data is transformed by FL functions 505 and 506 into data, of which the upper digits and the lower digits are exchanged, the two n-bit data are united, and 2n-bit data 559 is output.

FIG. 12 shows a general configuration of the cipher processing apparatus embodying the data transformation algorithm explained by referring to FIGS. 10 and 11.

In FIG. 12, reference numerals 701, 702, 703 denote a register A, a register B, and a register C, respectively. Reference numerals 711, 712, 713, 714 denote a selector A, a selector B, a selector C, and a selector D. 721, 722, 723 show XOR circuits, 724 shows a function FI operating circuit for data transformation, and 725 shows a function FL operating circuit for data transformation. 751 is an input data A, 752 is an input data B, 753 is an output data A, and 754 is an output data B.

Here, the register C 703, the selector C 713, the function FI operating circuit 724 and the XOR circuit 723 constitute a first operating circuit 101 for a first data transformation. The register C 703, the selector C 713, the function FI operating circuit 724, and the XOR circuit 723 constitute a loop processing circuit 201.

Figure 13:
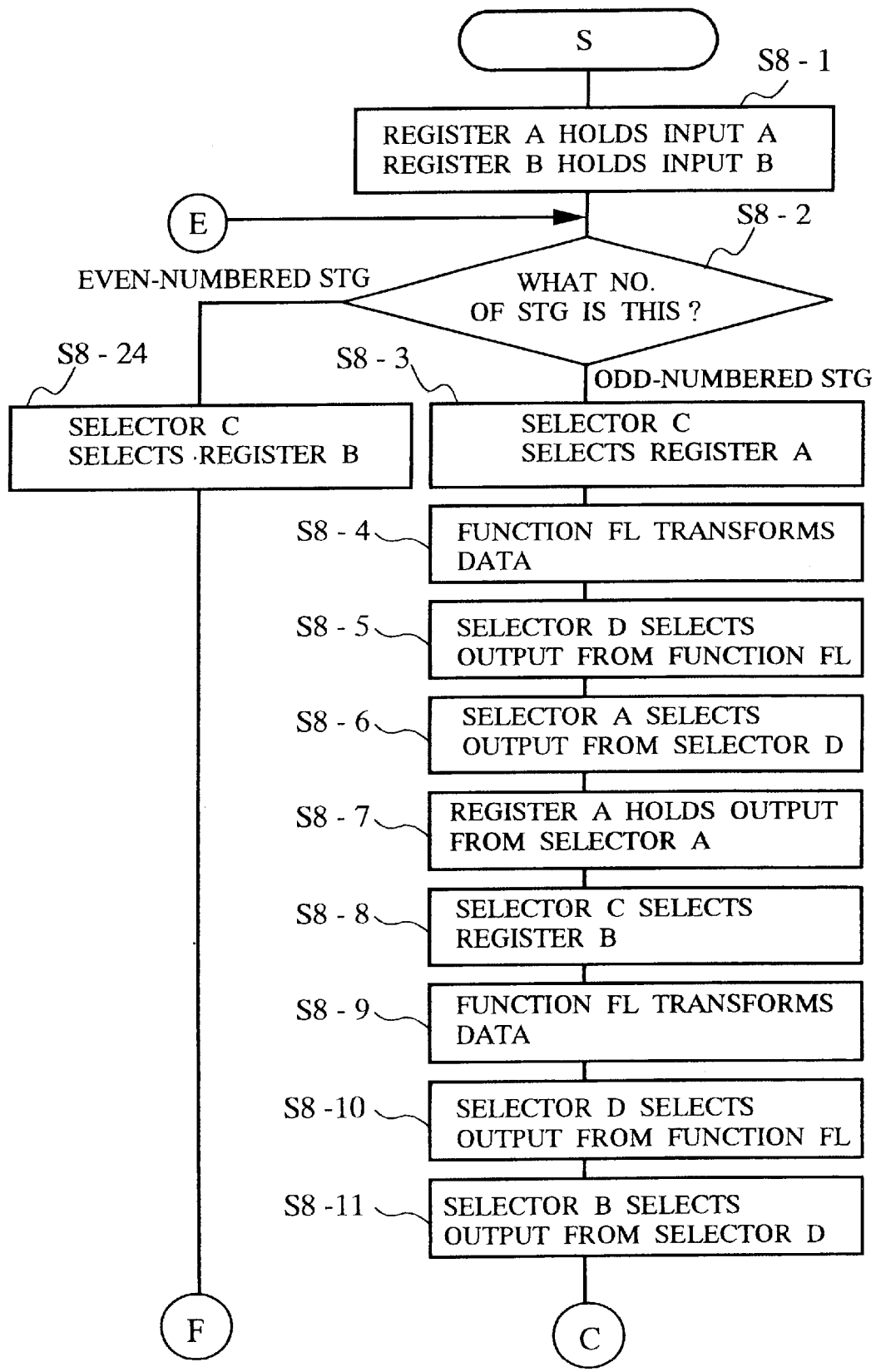
FIG. 13 is a flowchart showing an example of basic operations of the cipher processing apparatus according to the second embodiment of the invention.
Figure 14:
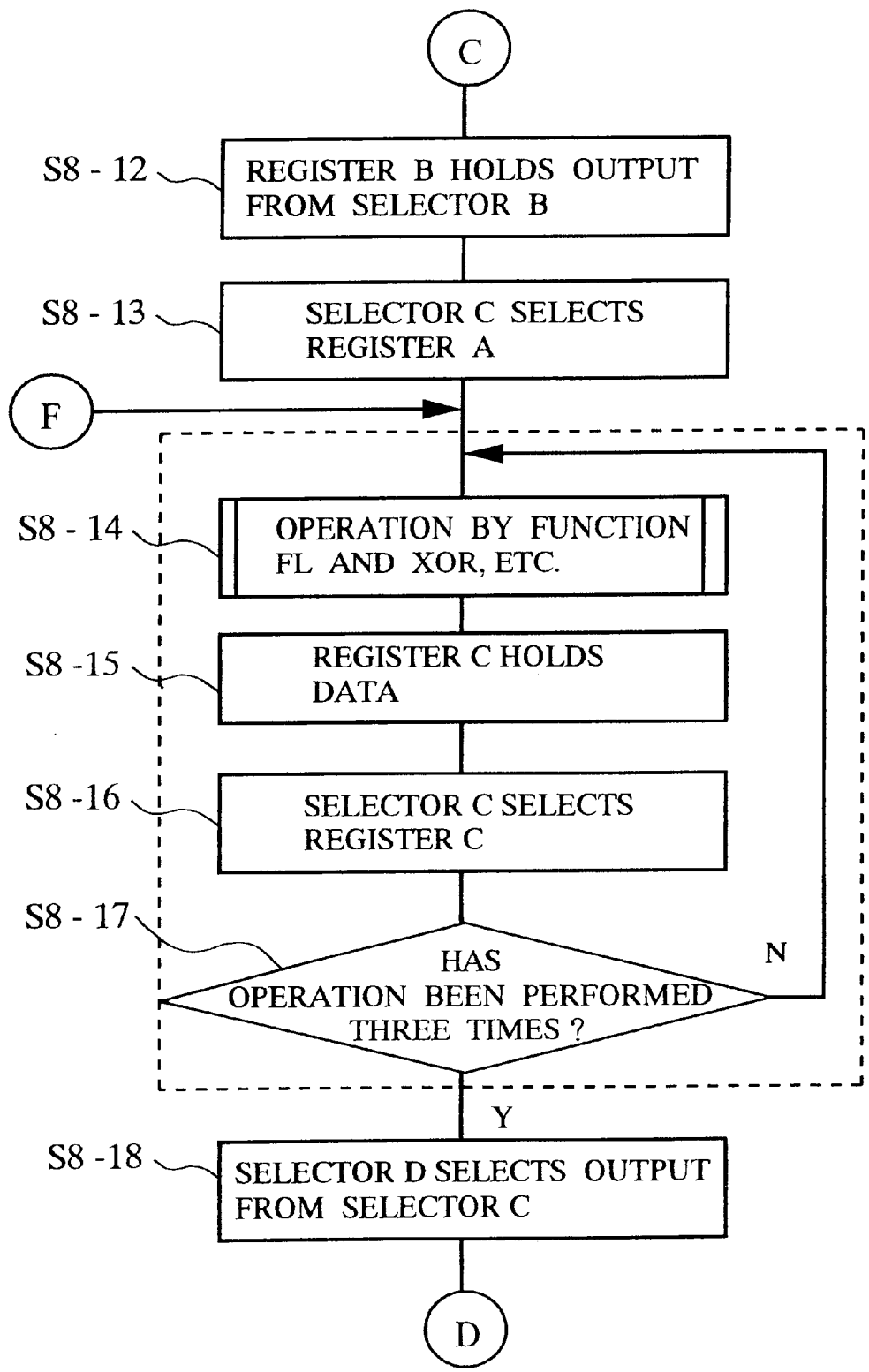
FIG. 14 is a flowchart showing one example of basic operations of the cipher processing apparatus according to the second embodiment of the invention.
Figure 15:
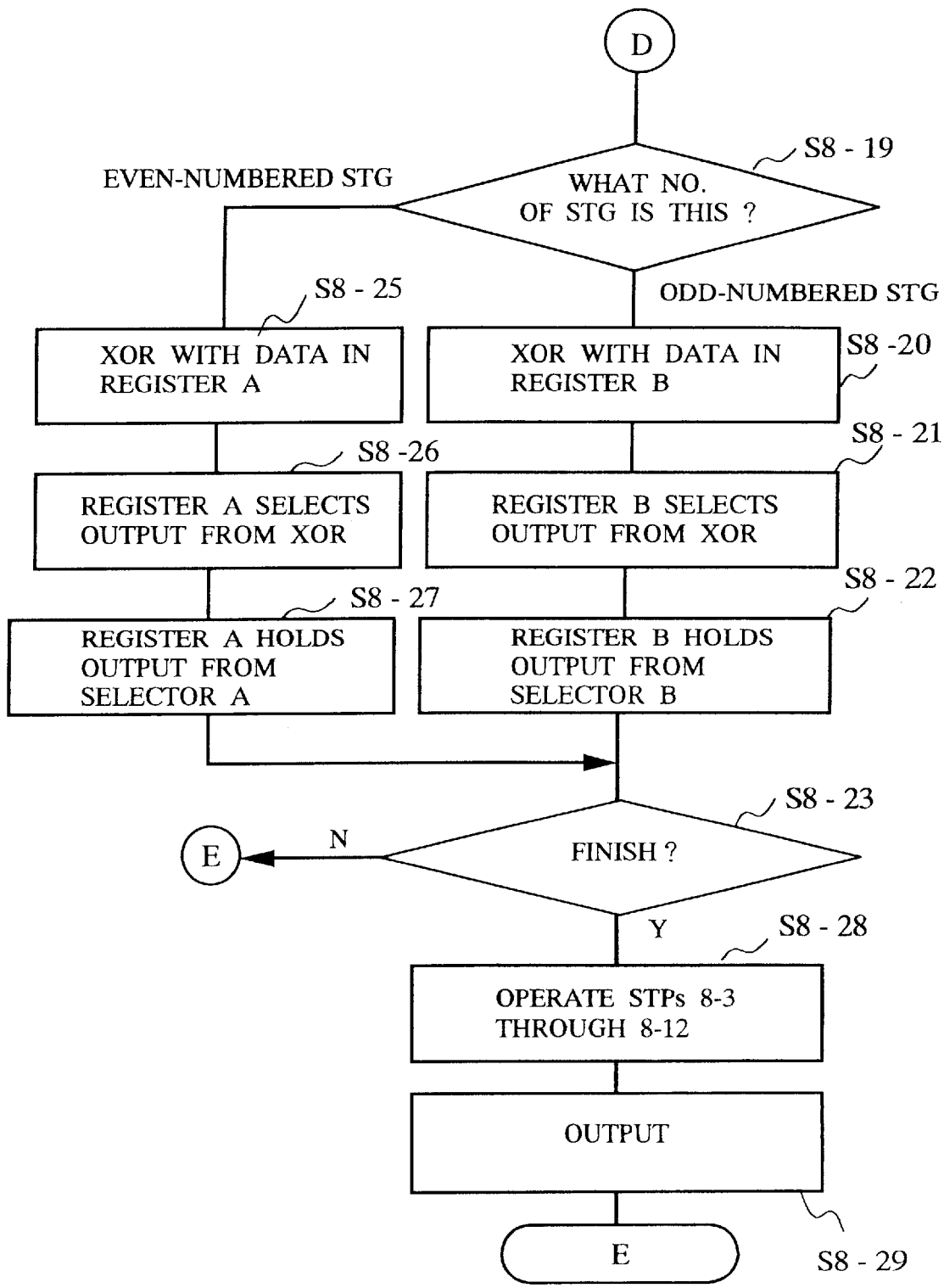
FIG. 15 is a flowchart showing an example of basic operations of the cipher processing apparatus according to the second embodiment of the invention.

FIGS. 13 through 15 are flowcharts explaining an operation of the cipher processing apparatus shown in FIG. 12.

The operation will be described by referring to FIGS. 13 through 15.

First, an input data having 2×n bits is divided into two n-bit data, and input as an input data A 751 and an input data B 752. In case of MISTY, n=32. The two input data are respectively selected by the selector A 711, the selector B 712 and respectively held in the register A 701, the register B 702 (at step 8-1).

Next, in the selector C 713, it is detected whether this is a process of an odd-numbered stage or a process of an even-numbered stage (at step 8-2), and the data held in the register A 701 is selected (at step 8-3). Then, the selected data is transformed by the function FL operating circuit 725 (at step 8-4), and the output data is selected by the selector D 714 (at step 8-5). Further, the selected data is selected by the selector A 711 (at step 8-6), and is held in the register A 701 (at step 8-7).

Next, in the selector C 713, the data held in the register B 702 is selected (at step 8-8). The selected data is transformed by the function FL operating circuit 725 (at step 8-9), and the output data is selected by the selector D 714 (at step 8-10). Further, the selected data is selected by the selector B 712 (at step 8-11), and is held in the register B (at step 8-12).

Next, in the selector C 713, the data held in the register A 701 is selected (at step 8-13). Then, the selected data (2×m bits) is divided into two m-bit data, and one m-bit data is output as an output data without any transformation. The other m-bit data is input to the function FI operating circuit 724 to be transformed. The transformed data is XORed bit by bit by the XOR circuit 723 with the other m-bit data, and the XORed result and the output m-bit data are united (at step 8-14). The united output data is held in the register C 703 (at step 8-15). With this step, a first process including the function FI operating circuit 724 has been completed.

Next, in the selector C 713, the data held in the register C 703 is selected (at step 8-16). The selected data (2×m bits) is divided into two m-bit data, and one m-bit data is output as an output data without any transformation. The other m-bit data is input to the function FI operating circuit 724 to be transformed. The transformed data is XORed bit by bit by the XOR circuit 723 with the other m-bit data, and the XORed result and the output m-bit data are united (at step 8-14). The united output data is held in the register C 703 (at step 8-15). With this step, a second process including the function FI operating circuit 724 has been completed.

Next, in the selector C 713, the data held in the register C 703 is selected (at step 8-16). The selected data (2×m bits) is divided into two m-bit data, and one m-bit data is output as an output data without any transformation. The other m-bit data is input to the function FI operating circuit 724 to be transformed. The transformed data is XORed bit by bit by the XOR circuit 723 with the other m-bit data, and the XORed result and the output m-bit data are united (at step 8-14). The united output data is held in the register C 703 (at step 8-15). With this step, a third process including the function FI operating circuit 724 has been completed.

Next, in the selector C 713, the data held in the register C 703 is selected (at step 8-16), and the selected data is selected by the selector D 714 (at step 8-18). Then, it is detected whether this is a process of an odd-numbered stage or a process of an even-numbered stage (at step 8-19), the selected data is fed back, and is XORed by the XOR circuit 722 with the data held in the register B 702 (at step 8-20). The output data from the XOR circuit B 702 is selected by the selector B 712 (at step 8-21), and is held in the register B 702 (at step 8-22). With this step, the data transformation process of the first stage terminates.

Next, a data transformation process corresponding to the data transformation process of the second stage shown in FIG. 10 is performed.

First, in the selector C 713, if an even-numbered stage is detected (at step 8-2), the data held in the register B 702 is selected (at step 8-24).

The selected data (2×m bits) is divided into two m-bit data, and one m-bit data is output as an output data without any transformation. The other m-bit data is input to the function FI operating circuit 724 to be transformed. The transformed data is XORed bit by bit by the XOR circuit 723 with the other m-bit data, and the XORed result and the output m-bit data are united (at step 8-14). The united output data is held in the register C 703 (at step 8-15). With this step, a first process including the function FI operating circuit 724 has been completed.

Next, in the selector C 713, the data held in the register C 703 is selected (at step 8-16). The selected data (2×m bits) is divided into two m-bit data, and one m-bit data is output as an output data without any transformation. The other m-bit data is input to the function FI operating circuit 724 to be transformed. The transformed data is XORed bit by bit by the XOR circuit 723 with the other m-bit data, and the XORed result and the output m-bit data are united (at step 8-14). The united output data is held in the register C 703 (at step 8-15). With this step, a second process including the function FI operating circuit 724 has been completed.

Next, in the selector C 713, the data held in the register C 703 is selected (at step 8-16). The selected data (2×m bits) is divided into two m-bit data, and one m-bit data is output as an output data without any transformation. The other m-bit data is input to the function FI operating circuit 724 to be transformed. The transformed data is XORed bit by bit by the XOR circuit 723 with the other m-bit data, and the XORed result and the output m-bit data are united (at step 8-14). The united output data is held in the register C 703 (at step 8-15). With this step, a third process including the function FI operating circuit 724 has been completed.

Next, in the selector C 713, the data held in the register C 703 is selected (at step 8-16), and the selected data is selected by the selector D 714 (at step 8-18). Then, it is detected to be an even-numbered stage (at step 8-19), the selected data is fed back, and is XORed bit by bit by the XOR circuit 721 with the data held in the register A 701 (at step 8-25). The output data from the XOR circuit A 721 is selected by the selector A 711 (at step 8-26), and is held in the register A 701 (at step 8-27). With this step, the data transformation process of the second stage terminates.

Hereinafter, data transformation process similar to the data transformation processes of the first stage and the second stage is repeated alternately a necessary number of times. MISTY performs up to a transformation process corresponding to the transformation process of an eighth stage.

Then, a process of step 8-28 is performed. At step 8-28, the above steps 8-3 through 8-12 are performed. First, in the selector C 713, the data held in the register A 701 is selected (at step 8-3). Next, the selected data is transformed by the function FL operating circuit 725 (at step 8-4), and the output data is selected by the selector D 714 (at step 8-5). Further, the selected data is selected by the selector A 711 (at step 8-6), and is held in the register A 701 (at step 8-7).

Next, in the selector C 713, the data held in the register B 702 is selected (at step 8-8). The selected data is transformed by the function FL operating circuit 725 (at step 8-9), the output data is selected by the selector D 714 (at step 8-10).

Further, the selected data is selected by the selector B 712 (at step 8-11), and is held in the register B (at step 8-12).

Finally, the data held in the register A 701 and the register B 702 are output as an output data A 753 and an output data B 754 (at step 8-29).

According to this embodiment, the cipher processing apparatus does not need to include three function FI operating circuits and three XOR circuits even when the functions FO 511 through 514 of each stage has such a configuration as shown in FIG. 11. It is enough for the cipher processing apparatus to include only one function FI operating circuit and one XOR circuit, which enables to reduce a circuit scale. Further, the cipher processing apparatus does not need to include a plurality of circuits for the functions FL 501 through 504 even when the cipher algorithm has a configuration as shown in FIG. 10. It is enough for the cipher processing apparatus to include only one function FL operating circuit, which also enables to reduce a circuit scale.

In case of MISTY of this embodiment, a function used for the function FI and the function FL should be strong against cryptanalysis, so that the function has an extremely complex configuration. Hence, the reduction of the circuit scale according to the present invention is quite effective.

Further, as clearly understood by the above description of the embodiment, it is not always required to operate the registers A through C, and the selectors A through D. The process can be performed with these circuits operating only when required, which takes a great effect on saving electric power.

Accordingly, it is very effective to apply this invention to a small apparatus such as an IC card. The invention can be applied not only to the IC card, but also to a reader/writer for the IC card.

Embodiment 3

Figure 16:
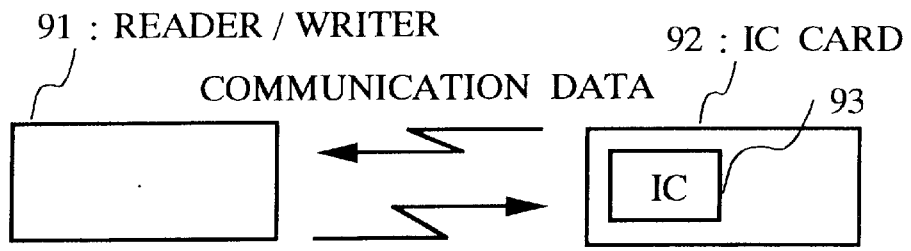
FIG. 16 is a block diagram showing a basic configuration of a communication system according to a third embodiment of the invention.
Figure 17:
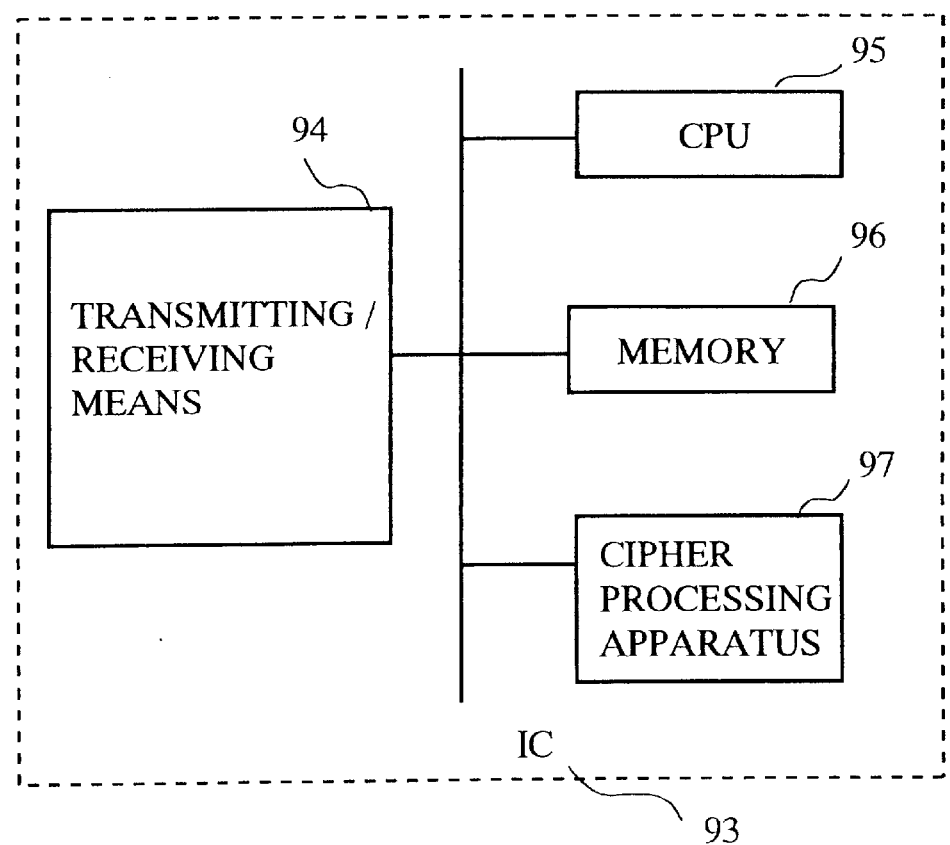
FIG. 17 is a block diagram showing a basic configuration of an IC according to the third embodiment of the invention.
Figure 18:
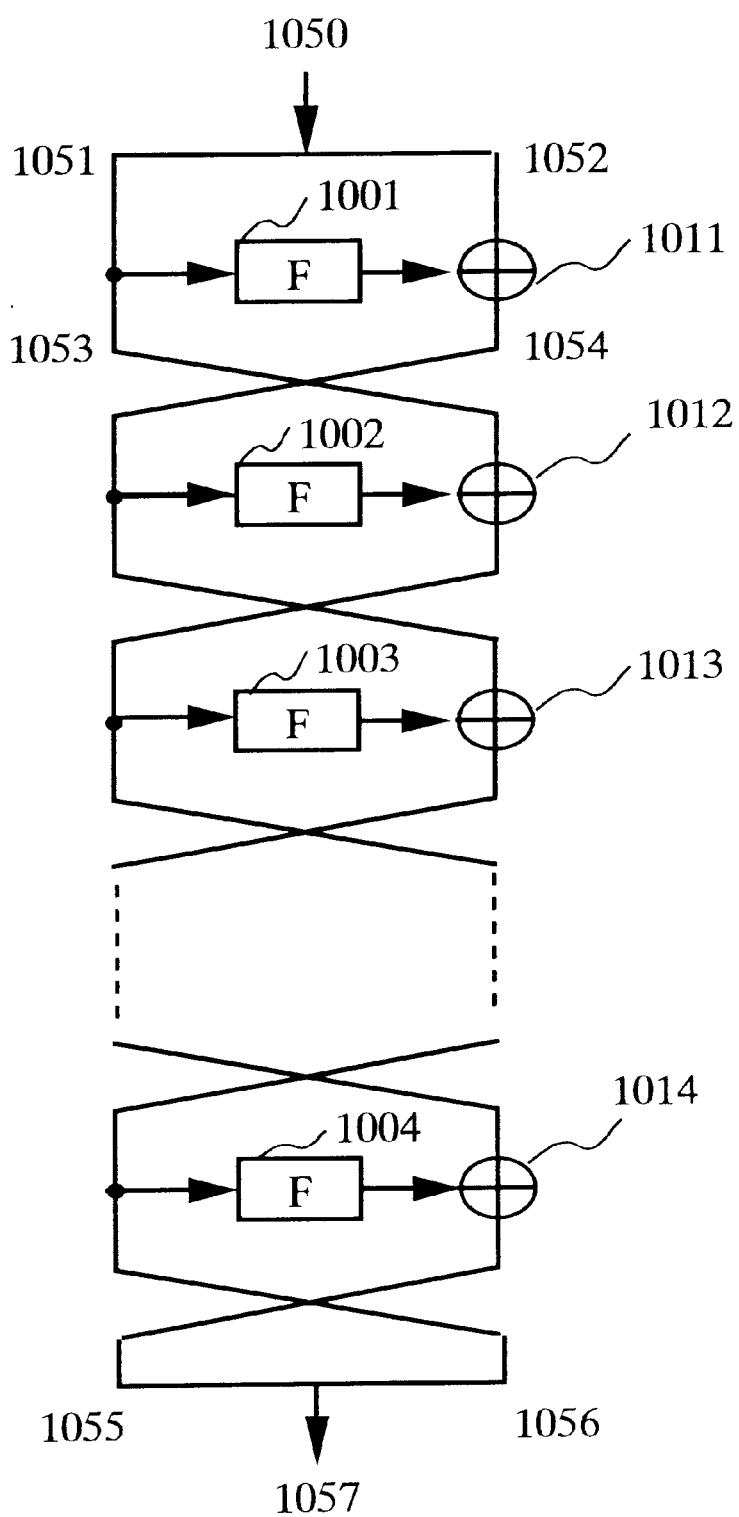
FIG. 18 shows an encryption algorithm according to the conventional related art.
Figure 19:
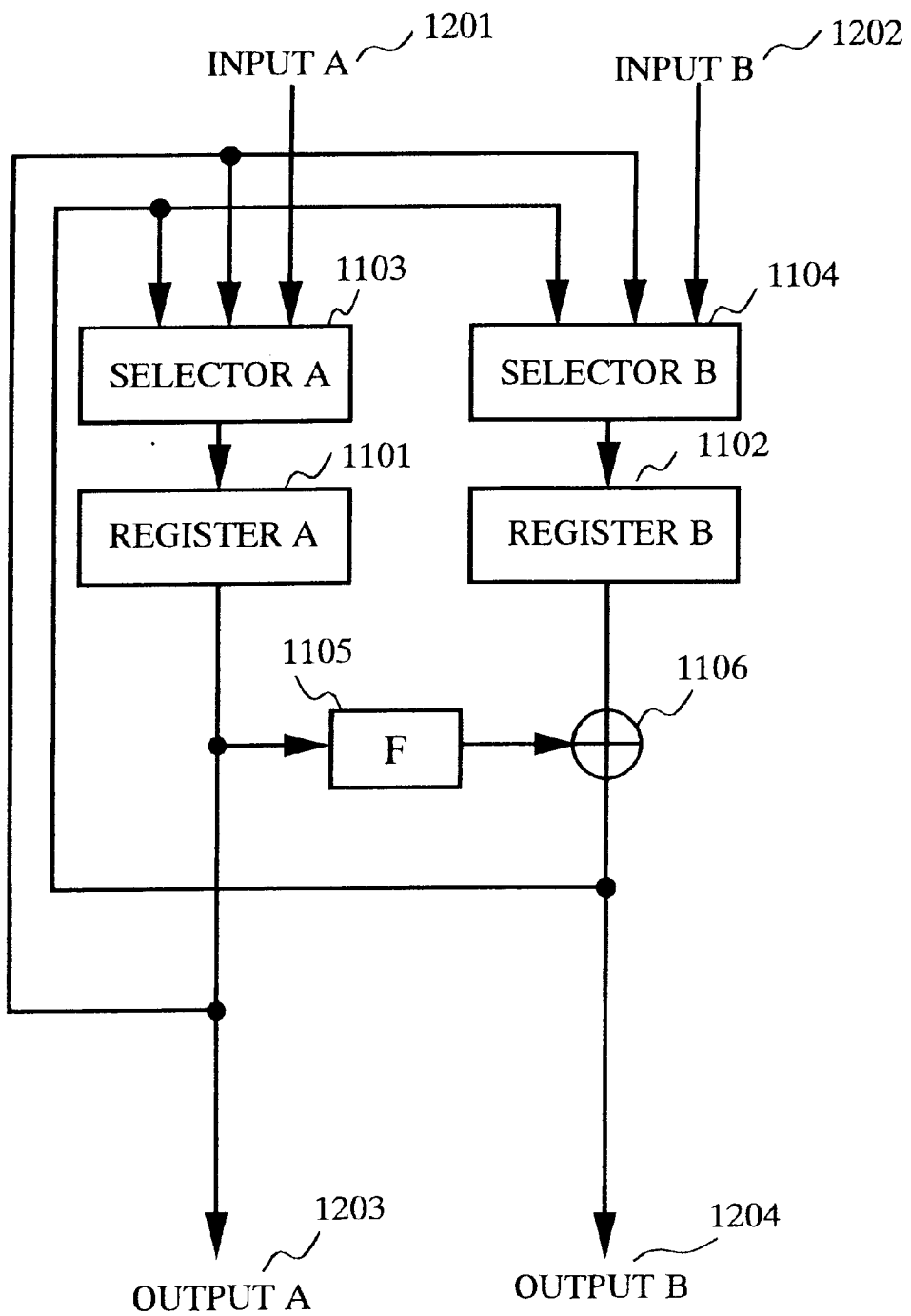
FIG. 19 is a block diagram showing a basic configuration of a cipher processing apparatus according to the conventional related art.

FIGS. 16 and 17 show general configurations of communication system of one embodiment of the present invention.

In FIGS. 16 and 17, a reference numeral 91 shows a reader/writer, a reference numeral 92 shows an IC (integrated circuit) card, and 93 shows an IC of the IC card 92. The IC 93 includes configurational elements: a transmitter/receiver 94 for transmitting/receiving communication data; a CPU (central processing unit) 95 for controlling the apparatus; a memory 96 for storing data and program, etc.; and a cipher processing apparatus 97 for encrypting/decrypting a communication data. The IC 93 includes the transmitter/receiver 94, the CPU 95, the memory 96, and the cipher processing apparatus 97 as configurational elements.

The cipher processing apparatus described in the first or the second embodiment is applied to the cipher processing apparatus 97.

In this communication system, the encrypted data is transmitted. Namely, in the IC card 92, the transmitter/receiver 94 transmits data encrypted by the cipher processing apparatus 97 to the reader/writer 91. The transmitter/receiver 94 also receives data transmitted from the reader/writer 91, and the received data is decrypted by the cipher processing apparatus 97 to implement communication.

In this case, communication between the reader/writer 91 and the IC card 92 can be either connected or unconnected.

Industrial Applicability

As has been described, according to the invention, in the communication system using encrypted data, the circuit scale of the cipher processing apparatus can be reduced and the electric power can be saved.

Further, an IC card can be effectively configured by applying the cipher processing apparatus of the invention. The reduction of the circuit scale and the saving electric power has been performed in the IC card.

What is claimed is:

1. A cipher processing apparatus performing a first data transformation process on an input data a plurality of times by a first operating circuit, wherein:
    the first operating circuit comprises a loop processing circuit for performing a second data transformation process a plurality of times;
        wherein the loop processing circuit comprises a second operating circuit, a data holding circuit, and a selecting circuit to form a processing loop;
        wherein the second operating circuit performs the second data transformation process;
    the data holding circuit tentatively holds the data on which the second data transformation process was performed; and
    the selecting circuit selects either to terminate or to continue the second data transformation process by the loop processing circuit; wherein said second operating circuit comprises:
        a data dividing circuit dividing data input to the second operating circuit into a first divided data and a second divided data;
        a third operating circuit transforming the first divided data;
        an XOR circuit XORing an output data from the third operating circuit with the second divided data bit by bit; and
        a data uniting circuit uniting an output data from the XOR circuit and the second divided data.

2. The cipher processing apparatus of claim 1, wherein the selecting circuit inputs a data for the first data transformation process by the first operating circuit and a data held in the data holding circuit, and the selecting circuit selects the data held in the data holding circuit when a process by the loop processing circuit is to be continued.

3. The cipher processing apparatus of claim 2, wherein the selecting circuit selects the data for the first data transformation process by the first operating circuit when a process by the processing loop circuit starts.

4. The cipher processing apparatus of claim 3, further comprising:
    a register A and a register B alternately holding the data for the first data transformation by the first operating circuit;
    two XOR circuits XORing bit by bit the data on which the first data transformation was performed by the first operating circuit with the data held in the register A and with the data held in the register B, respectively;
    a selector A and a selector B selecting one of the data on which the first data transformation was performed by a first operating unit and an XORed data by the XOR circuit to hold in the register A and the register B, respectively; and
        wherein the selecting circuit alternately selects the register A and the register B to start the process of the loop processing circuit.

5. The cipher processing apparatus of claim 1, wherein the first operating circuit further performs a data transformation different from the second data transformation process for the data on which the second data transformation was performed by a processing loop unit to output a transformed data.

6. The cipher processing apparatus of claim 1, wherein the second operating circuit comprises:

m (m≧1) number of function operating circuits inputting identical data from the selecting circuit; and a selector with m inputs and one output for inputting data operated by the m number of function operating circuits and selecting one of the input data.

7. The cipher processing apparatus of claim 1, further comprising:

a function operating unit transforming data output from the selecting circuit; and a selector inputting data operated by the function operating unit and the data output from the selecting circuit, and outputting one of the data.

8. A cipher processing method performing a first data transformation for an input data a plurality of times by a first operating step, wherein:

the first operating step comprises a loop processing step performing a second data transformation at a plurality of times;

wherein the loop processing step comprises:

a second operating step performing the second data transformation;

a data holding step temporarily holding data on which the second data transformation was performed; and a selecting step for selecting either to terminate or to continue the second data transformation by the loop processing step; wherein the second operating step comprises:

a data dividing step dividing data input to the second operating step into a first divided data and a second divided data;

a third operating step transforming the first divided data;

an XOR step XORing an output data from the third operating step with the second divided data bit by bit; and a data uniting step uniting an output data from the XOR step and the second divided data.

9. An IC (integrated circuit) card communicating data with a reader/writer, wherein the data is encrypted/decrypted by the cipher processing apparatus of claim 1, the IC card comprising:

a data receiving circuit receiving the data from the reader/writer; and a data transmitting circuit transmitting the data to the reader/writer.

10. An IC card communicating data with a reader/writer, wherein the data is encrypted/decrypted by the cipher processing apparatus of claim 1, the IC card comprising:

a data receiving circuit receiving the data from the reader/writer; and a data transmitting circuit transmitting the data to the reader/writer.

11. A cipher processing apparatus for inputting data A and data B to be encrypted, having a first operating unit for alternately performing a first data transformation on the data A and the data B; and a second operating unit for performing a second data transformation on one of the data A and the data B input to the first operating unit inside of the first operating unit, encrypting the data A and the data B by repeatedly operating the second operating unit inside of the first operating unit and by repeatedly operating the first operating unit, and outputting an encrypted data A and an encrypted data B, the cipher processing apparatus comprising:

a register A for inputting and holding the data A to be encrypted, holding and outputting the data A to be input to the first operating unit, and outputting the encrypted data A after repeatedly operating the first operating unit;

a register B for inputting and holding the data B to be encrypted, holding and outputting the data B to be input to the first operating unit, and outputting the encrypted data B after repeatedly operating the first operating unit;

a register C, provided inside of the first operating unit, for repeatedly holding and outputting the data C output from the second operating unit;

a selector C for selecting one of the register A, the register B and the register C, and outputting the data held in the register selected;

an XOR circuit A for XORing the data output by the selector C with the data A held in the register A;

a selector A for selecting a result XORed by the XOR circuit A, outputting the result to the register A to make the register A hold the result;

an XOR circuit B for XORing the data output by the selector C with the data B held in the register B; and a selector B for selecting a result XORed by the XOR circuit B, outputting the result to the register B to make the register B hold the result, wherein the first operating unit includes the second operating unit, the register C and the selector C; wherein the second operating unit, the register C and the selector C form a first processing loop inside of the first operating unit for repeatedly performing the second data transformation by the second operating unit; and wherein the first operating unit forms the second processing loop with the XOR circuits A and B, the selectors A and B, and the registers A and B for repeatedly performing the first data transformation by the first operating unit;

wherein the second operating unit inputs the data output from the selector C, performs the second data transformation on the data, outputs the data to the register C to make the register C hold the data as data C;

wherein the selector C alternately selects the data A held in the register A and the data B held in the register B to output to the second operating unit to make the first operating unit repeatedly perform the first data transformation alternately on the data A and the data B with making the second operating unit start repeatedly performing the second data transformation in case of repeatedly operating the first operating unit; the selector C selects the data C held in the register C to output to the second operating unit to make the second operating unit repeatedly perform the second data transformation in case of repeatedly performing the second data transformation by the second operating unit; and the selector C selects the data C held in the register C to output to the XOR circuits A and B, and makes the XOR circuits A and B XOR in case of terminating the second data transformation by the second operating unit being performed repeatedly, wherein the selectors A and B alternately select the result XORed by the XOR circuit A and the result XORed by the XOR circuit B and output the result to the registers A and B, and make the registers A and B alternately hold the result in case of terminating the second data transformation by the second operating unit being performed repeatedly.

12. A cipher processing apparatus for inputting data A and data B to be encrypted;

having a first operating unit for alternately performing a first data transformation on the data A and the data B; and a second operating unit for performing a second data transformation on one of the data A and the data B input to the first operating unit inside of the first operating unit;

encrypting the data A and the data B by repeatedly operating the second operating unit inside of the first operating unit and by repeatedly operating the first operating unit, and outputting an encrypted data A and an encrypted data B the cipher processing apparatus comprising:

an input line A for inputting the data A to be encrypted, an input line B for inputting the data B to be encrypted, an output line A for outputting the encrypted data A; and an output line B for outputting the encrypted data B;

registers A, B and C for holding data;

selectors A, B and C for selecting data;

XOR circuits A and B;

wherein the first operating unit includes the selector C and the register C and the second operating unit;

wherein the register A is connected to an output side of the selector A, and also connected to the output line A for outputting the data A, an input side of the selector C and an input side of the XOR circuit A;

wherein the register B is connected to an output side of the selector B, and also connected to the output line B for outputting the data B, an input side of the selector C and an input side of the XOR circuit B;

wherein the selector A is connected to the input line A for inputting the data A and an output side of the XOR circuit A, and also connected to an input side of the register A; and the selector A inputs the data A from the input line A and outputs the data A to make the register A hold the data A in case of initiating a first operation of the first operating unit;

wherein the selector B is connected to the input line B for inputting the data B and the output side of the XOR circuit B, and also connected to an input side of the register B; and the selector B inputs the data B from the input line B and outputs the data B to make the register B hold the data B in case of initiating the first operation of the first operating unit;

wherein the selector C is connected to an output side of the register A, an output side of the register B and an output side of the register C, and also connected to an input side of the second operating unit, an input side of the XOR circuit A and an input side of the XOR circuit B;

wherein the second operating unit is connected to an output side of the selector C, and also connected to an input side of the register C; and the second operating unit performs the second data transformation on the data selected by the selector C and outputs a result of the second data transformation to make the register C hold the result as data C;

wherein the register C is connected to an output side of the second operating unit, and also connected to an input side of the selector C;

wherein the XOR circuit A is connected to an output side of the selector C and an output side of the register A, and also connected to an input side of the selector A; the XOR circuit A XORs the data C output from the selector C with the data A held in the register A and outputs an XORed result to the selector A;

wherein the XOR circuit B is connected to an output side of the selector C and an output side of the register B, and also connected to an input side of the selector B; the XOR circuit B XORs the data C output from the selector C with the data B held in the register B and outputs an XORed result to the selector B;

wherein the selector C selects the data A held in the register A and outputs the data A to the second operating unit, the XOR circuit A and the XOR circuit B in case of initiating an odd-numbered operation of the first operating unit; the selector C selects the data B held in the register B and outputs the data B to the second operating unit, the XOR circuit A and the XOR circuit B in case of initiating an even-numbered operation of the first operating unit; and the selector C selects the data C held in the register C and outputs the data C to the second operating unit, the XOR circuit A and the XOR circuit B in case of repeatedly operating the second operating unit or terminating the second operating unit being operated repeatedly; and wherein the selector A does not select the result XORed by the XOR circuit A to make the register A hold the data A as it is in case of terminating the odd-numbered operation of the first operating unit; and the selector A selects the result XORed by the XOR circuit A to make register A hold the result as the data A in case of terminating the even-numbered operation of the first operating unit;

wherein the selector B does not select the result XORed by the XOR circuit B to make the register B hold the data B as it is in case of terminating the even-numbered operation of the first operating unit; and the selector B selects the result XORed by the XOR circuit B to make register B hold the result as the data B in case of terminating the odd numbered operation of the first operating unit.

13. The cipher processing apparatus according to claim 11, wherein the second operating unit comprises:

a data dividing unit for dividing the data input to the second operating unit into a first divided data and a second divided data;

a third operating unit for transforming the first divided data;

an XOR unit for XORing an output data of the third operating unit with the second divided data bit by bit; and a data uniting unit for uniting an output data of the XOR unit and the second divided data.

14. An IC card for communicating data with a reader/writer comprising:

a data receiving unit for receiving the data from the reader/writer;

a data transmitting unit for transmitting the data to the reader/writer; and a cipher processing apparatus according to claim 13 for encrypting the data.

15. A cipher processing method implemented by a cipher processing apparatus having registers A, B, C, selectors A, B, C, and XOR circuits A and B, inputting data A and data B to be encrypted;

having a first operating step for alternately performing a first data transformation on the data A and the data B;

having a second operating step, provided in the first operating step, for performing a second data transformation on the data A or the data B input to the first operating step;

encrypting the data A and the data B by repeatedly operating the second operating step inside of the first operating step and by repeatedly operating the first operating step;

outputting an encrypted data A and an encrypted data B, the cipher processing method comprising:

inputting the data A to be encrypted to hold in the register A, holding the data A to be input to the first operating step in the register A, outputting the data A to the first operating step, and outputting the encrypted data A from the register A after repeatedly operating the first operating step;

inputting the data B to be encrypted to hold in the register B, holding the data B to be input to the first operating step in the register B, outputting the data B to the first operating step, and outputting the encrypted data B from the register B after repeatedly operating the first operating step;

provided in the first operating step, repeatedly holding the data C output from the second operating step in the register C and outputting the data C;

selecting one of the registers A, B and C, and outputting the data held in the register selected;

XORing the data selected by the selector C with the data A held in the register A by the XOR circuit A;

selecting a result XORed by the XOR circuit A and outputting the result to the register A to hold the result;

XORing the data output from the selector C with the data B held in the register B by the XOR circuit B;

selecting a result XORed by the XOR circuit B and outputting the result to the register B to hold the result;

wherein the first operating step includes the second operating step, the register C step and the selector C step; the second operating step, the register C step and the selector C step form a first processing loop step inside of the first operating step for repeatedly performing a second data transformation by the second operating step; and the XOR circuit A step, the XOR circuit B step, the selector A step, the selector B step, the register A step, and the register B step form a second processing loop for repeatedly performing the first data transformation by the first operating step;

wherein the second operating step inputs the data input from the selector C step, performs the second data transformation on the data and outputs the data to the register C to make the register C hold the data in the register C as data C;

wherein the selector C step alternately selects the data A held in the register A and the data B held in the register B to output to the second operating step for repeatedly performing the first data transformation by the first operating step alternately on the data A and the data B by initiating repeatedly performing the second data transformation by the second operating step in case of repeatedly operating the first operating step; the selector C step selects the data C held in the register C to output to the second operating step for repeatedly performing the second data transformation by the second operating step in case of repeatedly performing the second data transformation by the second operating step; and the selector C step selects the data C held in the register C to output to the XOR circuit A step and the XOR circuit B step for XORing the data in case of terminating the second data transformation by the second operating step being performed repeatedly, and wherein the selector A step and the selector B step alternately select the result XORed by the XOR circuit A step and the result XORed by the XOR circuit B step and output the result to the registers A an d B to make the registers A and B alternately hold the result in case of terminating the second data transformation by the second operating step being performed repeatedly.

* * * * *